United States Patent
Sugawara

(10) Patent No.: US 9,165,020 B2
(45) Date of Patent: Oct. 20, 2015

(54) STRING SUBSTITUTION APPARATUS, STRING SUBSTITUTION METHOD AND STORAGE MEDIUM

(71) Applicant: FUJITSU LIMITED, Kawasaki (JP)

(72) Inventor: Hisashi Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 13/973,436

(22) Filed: Aug. 22, 2013

(65) Prior Publication Data

US 2014/0067769 A1 Mar. 6, 2014

(30) Foreign Application Priority Data

Aug. 24, 2012 (JP) .................. 2012-185218

(51) Int. Cl.
*G06F 17/30* (2006.01)

(52) U.S. Cl.
CPC .... *G06F 17/30289* (2013.01); *G06F 17/30303* (2013.01)

(58) Field of Classification Search
USPC .................. 707/678, 778
See application file for complete search history.

(56) References Cited

U.S. PATENT DOCUMENTS

| | | | | |
|---|---|---|---|---|
| 4,906,991 A * | 3/1990 | Fiala et al. | | 341/51 |
| 5,058,144 A * | 10/1991 | Fiala et al. | | 375/240 |
| 7,047,279 B1 * | 5/2006 | Beams et al. | | 709/204 |
| 7,770,112 B2 * | 8/2010 | Iwakura et al. | | 715/271 |
| 8,005,847 B2 * | 8/2011 | Levy et al. | | 707/755 |
| 8,156,213 B1 * | 4/2012 | Deng et al. | | 709/223 |
| 8,341,165 B2 * | 12/2012 | Jones | | 707/756 |
| 8,631,387 B2 * | 1/2014 | Henderson | | 717/108 |
| 8,775,476 B2 * | 7/2014 | Henderson | | 707/798 |
| 8,782,268 B2 * | 7/2014 | Pyle et al. | | 709/231 |
| 8,914,859 B2 * | 12/2014 | Erickson et al. | | 726/6 |

FOREIGN PATENT DOCUMENTS

| | | |
|---|---|---|
| JP | 2005-11049 | 1/2005 |
| JP | 2011-8389 | 1/2011 |

* cited by examiner

*Primary Examiner* — Kim Nguyen
(74) *Attorney, Agent, or Firm* — Staas & Halsey LLP

(57) ABSTRACT

A method includes: unifying plural types of substitution tables in each of which a substitution source string and a substitution destination string are mapped to each other into a single substitution table; constructing a prefix tree to incorporate the substitution source string registered in the single substitution table, a string in the prefix tree represented by characters of a label assigned to plural branches on route from a root node to a certain node is identical to the substitution source string mapped to the substitution source string; performing addition of a link failure directing from a first node to a second node for all nodes included in the prefix tree under a certain condition; and searching the substitution source string included in the target string by repeating migration between nodes in the prefix tree based on a certain condition to record identification information assigned to a node before migration.

20 Claims, 16 Drawing Sheets

FIG. 4A

| ID | NAME | ADDRESS |
|---|---|---|
| 001 | 富士通ミドルウェア | 神奈川県横浜市港北区 |
| 002 | 富士通MW | 横浜市港北区 |
| 003 | XYZ通信 | 墨田区 |
| ... | ... | ... |

FIG. 4B

| ID | NAME | ADDRESS |
|---|---|---|
| 001 | 富士通ミドルウェア | 神奈川県横浜市港北区 |
| 002 | 富士通MW | 神奈川県横浜市港北区 |
| 003 | XYZ通信 | 東京都墨田区 |
| ... | ... | ... |

FIG. 4C

| ID | NAME | ADDRESS |
|---|---|---|
| 001 | 富士通ミトルウェア | 神奈川県横浜市港北区 |
| 002 | 富士通ミトルウェア | 神奈川県横浜市港北区 |
| 003 | XYZ通信 | 東京都墨田区 |
| ... | ... | ... |

FIG. 4D

| ID1 | ID2 | SCORE |
|---|---|---|
| 001 | 002 | 100 |
| 003 | 006 | 90 |
| 100 | 101 | 99 |
| ... | ... | ... |

FIG. 6A

BINDING RULE (1)

A SUBSTITUTION SOURCE STRING IN A SUBSTITUTION PATTERN A IS IDENTICAL TO A SUBSTITUTION SOURCE STRING IN A SUBSTITUTION PATTERN B

| SUBSTITUTION PATTERN A | SUBSTITUTION PATTERN B | NEW SUBSTITUTION PATTERN |
|---|---|---|
| あいう → アイウ | あいう → AIU | あいう → アイウ |

→EMPLOYING A SUBSTITUTION PATTERN A

FIG. 6B

BINDING RULE (2)

A SUBSTITUTION SOURCE STRING IN A SUBSTITUTION PATTERN A IS IDENTICAL TO A SUBSTITUTION DESTINATION STRING IN A SUBSTITUTION PATTERN B

| SUBSTITUTION PATTERN A | SUBSTITUTION PATTERN B | NEW SUBSTITUTION PATTERN |
|---|---|---|
| あいう → アイウ | アイウ → AIU | あいう → AIU |

→EMPLOYING A NEW SUBSTITUTION PATTERN THAT SUBSTITUTES A SUBSTITUTION SOURCE OF A SUBSTITUTION PATTERN A WITH A SUBSTITUTION DESTINATION OF A SUBSTITUTION PATTERN B

FIG. 6C

BINDING RULE (3)

A SUBSTITUTION DESTINATION STRING OF A SUBSTITUTION PATTERN A INCLUDES A SUBSTITUTION SOURCE STRING OF THE SUBSTITUTION PATTERN B

| SUBSTITUTION PATTERN A | SUBSTITUTION PATTERN B | NEW SUBSTITUTION PATTERN |
|---|---|---|
| あいう → アイウ | アイ → AI | あいう → AIウ<br>アイ→AI |

→A SUBSTITUTION SOURCE OF A SUBSTITUTION PATTERN A IS A SUBSTITUTION DESTINATION OF A SUBSTITUTION PATTERN B AND A PORTION OF A SUBSTITUTION DESTINATION OF A SUBSTITUTION PATTERN A

→EMPLOYING A SUBSTITUTION PATTERN B

FIG. 6D

BINDING RULE (4)

A SUBSTITUTION DESTINATION STRING OF THE SUBSTITUTION PATTERN A IS INCLUDED IN A SUBSTITUTION SOURCE STRING OF THE SUBSTITUTION PATTERN B

| SUBSTITUTION PATTERN A | SUBSTITUTION PATTERN B | NEW SUBSTITUTION PATTERN |
|---|---|---|
| あい → アイ | アイウ → AIU | あいウ → AIU<br>あい → アイ<br>アイウ → AIU |

→ A SUBSTITUTION SOURCE OF A SUBSTITUTION PATTERN A AND SOME OF A SUBSTITUTION SOURCE OF A SUBSTITUTION PATTERN B IS A SUBSTITUTION DESTINATION OF A SUBSTITUTION PATTERN B

→ EMPLOYING A SUBSTITUTION PATTERN A OR A SUBSTITUTION PATTERN B

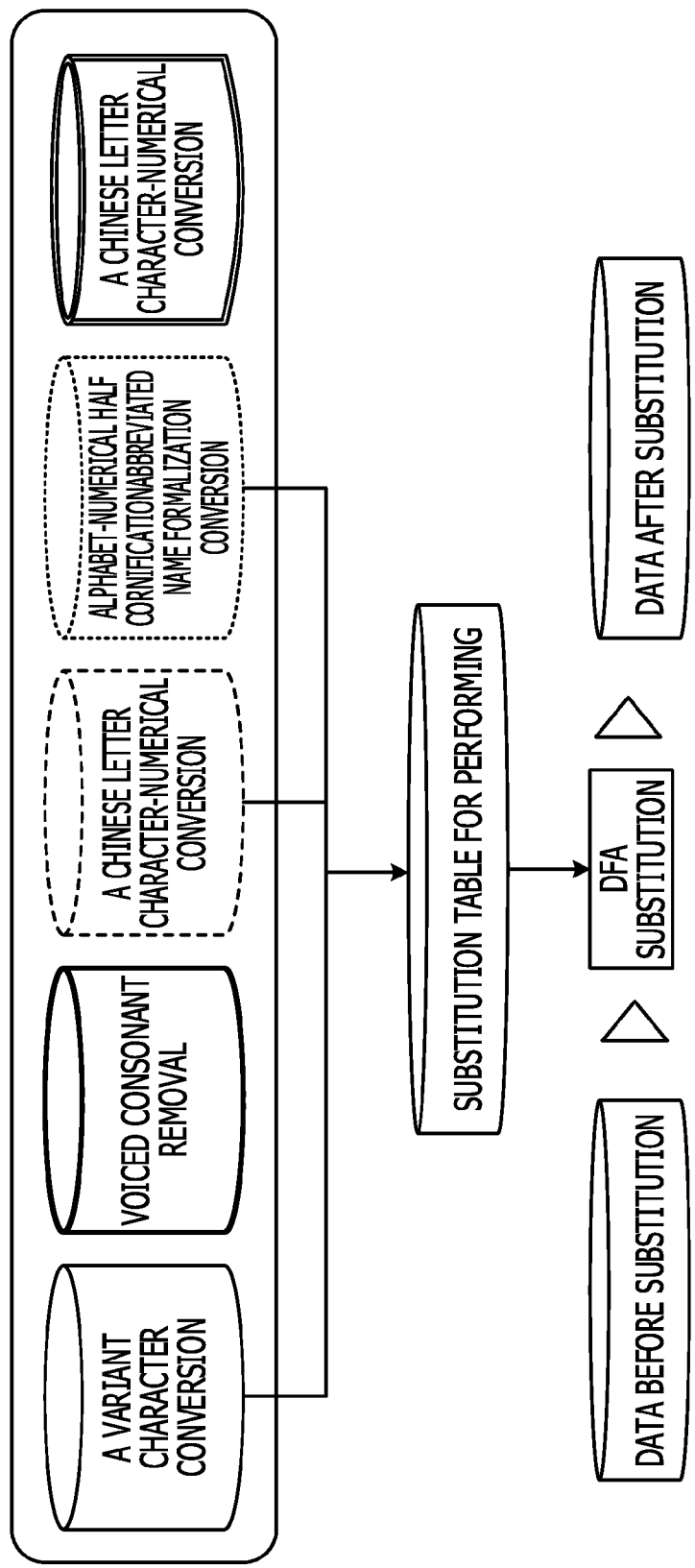

STRING SUBSTITUTION APPARATUS, STRING SUBSTITUTION METHOD AND STORAGE MEDIUM

CROSS-REFERENCE TO RELATED APPLICATION

This application is based upon and claims the benefit of priority from the prior Japanese Patent Application No. 2012-185218 filed on Aug. 24, 2012, the entire contents of which are incorporated herein by reference.

FIELD

The present disclosure relates to a string substitution apparatus, a string substitution method and a storage medium storing a string substitution program.

BACKGROUND

When a name identification is performed in which the data of the same person among the data registered in a database is determined and unified, the string representing the name registered in the database may be substituted in order to make the strings representing the name of the same person to be consistent with each other.

Regarding the substitution described above, a first technology has been proposed in which a rounding operation is performed for the data that cannot be unified in a master database where, for example, registrations are made by kanji character names and kana names, and a Kanji character full name written in Kanji character is defective and a kana full name may be erroneously readable. The first technology unifies and outputs the non-unified data that went through the rounding conversion to the master database to implement the name identification processing for the data of the kana name. See, for example, Japanese Laid-Open Patent Publication No. 2011-8389.

Further, a second technology has been proposed in which a name and an address of a person registered in a plurality of databases utilized in different systems are transcribed into a unified format and an individual name identification edition file is generated. In the second technology, the individual information registered in each individual name identification edition file is merged, duplicated individual information is deleted, a unified name identification edition file is generated and an address in the unified name identification edition file is converted into a regional Japanese Industrial Standards (JIS) code to generate a single unified database. See, for example, Japanese Laid-Open Patent Publication No. 2005-11049.

SUMMARY

According to an aspect of the invention, a string substitution apparatus includes a memory and a processor coupled to the memory. The processor is configured to unify plural types of substitution tables into a single substitution table, a substitution source string and a substitution destination string being mapped to each other and registered in each of the plural types of substitution tables, construct a prefix tree to incorporate the substitution source string registered in the single substitution table unified, the prefix tree having plural nodes and plural branches each of which connects a pair of nodes of the plural nodes and is assigned a label of one character and in which characters of the label assigned to the branches each of which having one end connected to the same node are different from each other, and a string represented by characters of the label assigned to plural branches on route from a root node to a certain node is identical to the substitution source string mapped to the substitution source string, perform an addition of a link failure directing from a first node to a second node for all nodes included in the prefix tree using each of all nodes as the first node in a case where a suffix having the longest length of a string represented by characters of the label assigned to plural branches on route from the root node to the first node included in the prefix tree constructed is identical to a string represented by characters of the label assigned to plural branches on route from the root node to a second node which is different from the first node, and repeat migrating to a node connected to the other end of branch to which a character extracted is assigned as a label among the branches each of which having one end connected to the current node using the root node as an initial node in a case where the branch is present, migrating to a node connected to a front end of the link failure in a case where the branch to which the character extracted is assigned as a label among the branches each of which having one end connected to the current node is not present and a basis end of the link failure is connected to the current node, and recording of identification information in a case where the identification information is assigned to a node before migration, while extracting characters from a target string for substitution one character by one character, until all characters are extracted from a top most of the target string, thereby searching the substitution source string included in the target string.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A, 4B, 4C and 4D are diagrams illustrating an example of a target data for name identification, data after cleansing processing, data after string substitution processing, and a matching result, respectively.

FIGS. 6A, 6B, 6C and 6D are schematic diagrams illustrating the unification of plural types of substitution tables.

FIG. 7 is a schematic diagram for explaining an application sequence of plural types of substitution tables.

DESCRIPTION OF EMBODIMENTS

In a string substitution, a substitution table is prepared in which a substitution source string and a substitution destination string are mapped onto each other and registered. A target string for conversion is collated with the substitution source string registered in the substitution table to search whether a substitution source string is included in the target string to be converted ("target string" hereinafter). The substitution source string included in the target string is substituted with the corresponding substitution destination string to implement the string substitution. However, there is a possibility that a portion of different substitution source strings are duplicated in the target string. Therefore, in the collation process between the target string and the substitution source string registered in the substitution table, there is a need to perform the collations between the substitution source string and a plurality of the target strings in parallel or the collation between each substitution source string and the target string may be performed while changing the position of a target character for collation among the target string in the longitudinal direction. Therefore, there is a problem in that the searching for the substitution source string included in the target string takes a relatively long time.

Further, in order to implement the name identification processing as a string substitution, there is a need to perform plural types of string substitutions such as, for example, variant character conversion or voiced consonant removal, a kanji character-numerical conversion, alphabet-numerical half width operation, abbreviated name formalization conversion. Each string substitution is implemented in such a manner that each individual substitution table is prepared and a target string is collated with a substitution source string registered in each substitution table to search the target string in consideration of maintainability. Therefore, when performing plural types of string substitutions, there is a need to perform a collation/searching of a target string with a substitution source string registered in the substitution table plural times, and thus, there is also a problem in that it takes a relatively long time for a string substitution.

With respect to these problems, the first and second techniques described above do not disclose a configuration to solve the problems described above.

An aspect of the present invention intends to reduce a processing time when a substitution source string included in a target string is substituted with a substitution destination string.

Figure 1:
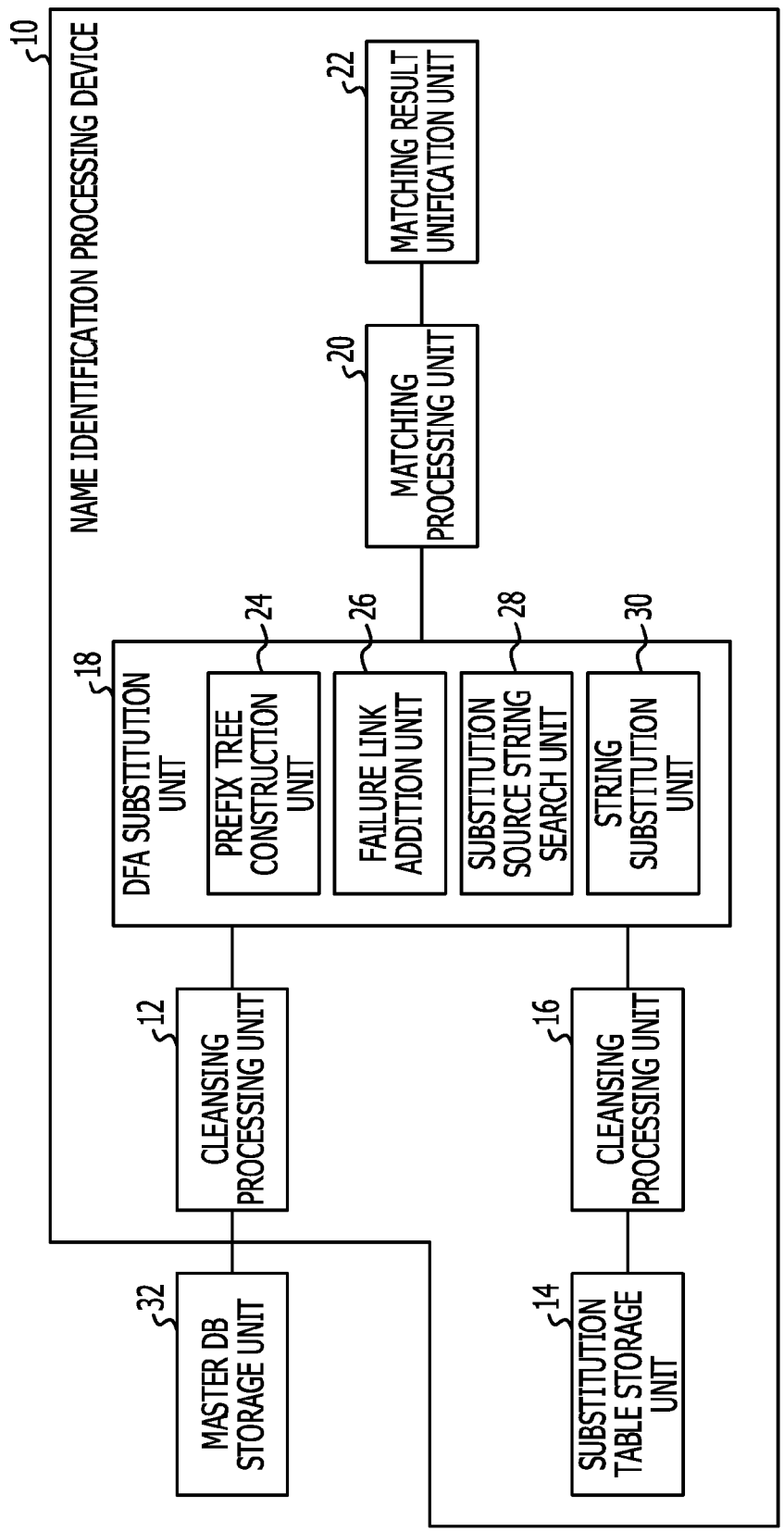
FIG. 1 is a functional block diagram illustrating a name identification processing device described in an embodiment.

Hereinafter, an exemplary embodiment of a technique is described with reference to the accompanying drawings in detail. A name identification processing device 10 according to the present embodiment is illustrated in FIG. 1. The name identification processing device 10 is coupled to a master database (DB) storage unit 32 and performs a name identification in which the data of the same person is determined and unified among the data registered in a master DB stored in the master DB storage unit 32.

The name identification processing device 10 includes a cleansing processing unit 12, a substitution table storage unit 14, a substitution table unification unit 16, a deterministic finite automaton (DFA) substitution unit 18, a matching processing unit 20 and a matching result unification unit 22.

The cleansing processing unit 12 performs a cleansing processing such as address data normalization or address data supplementation, for the data registered in the master DB. The substitution table storage unit 14 stores plural types of substitution tables in which the substitution source string and the substitution destination string are mapped with each other and registered. In the present embodiment, the substitution tables stored in the substitution table storage unit 14 includes a substitution table used for performing variant character conversion, a substitution table used for performing voiced consonant removal, and a substitution table used for performing a kanji character-numerical conversion. Further, the substitution tables stored in the substitution table storage unit 14 includes a substitution table used for performing alphabet-numerical half width operation and a substitution table used for performing abbreviated name formalization conversion. See, for example, FIG. 6.

The substitution table unification unit 16 unifies the substitution tables selected for applying to the string substitution among the plural types of substitution tables into a single substitution table. The DFA substitution unit 18 searches the data that went through the cleansing processing in order to determine whether the substitution source string registered in the substitution table unified by the substitution table unification unit 16 is included in the data that went through the cleansing processing. The DFA substitution unit 18 performs a string substitution which substitutes the substitution source string included in the data that went through the cleansing processing (target string for substitution) with the substitution destination string mapped onto the substitution source string.

The DFA substitution unit 18 includes a prefix tree construction unit 24, a failure link addition unit 26, a substitution source string search unit 28 and a string substitution unit 30. The prefix tree construction unit 24 constructs a prefix tree (trie) for searching the substitution source string included in the target string from the substitution source string registered in the substitution table unified by the substitution table unification unit 16. The failure link addition unit 26 adds a failure link which represents a migration destination when the matching of the target string and the substitution source string is failed to the prefix tree constructed by the prefix tree construction unit 24.

The substitution source string search unit 28 searches the substitution source string included in the target string using a prefix tree which is constructed by the prefix tree construction unit 24 and to which failure link is added by the failure link addition unit 26. The string substitution unit 30 performs a string substitution which substitutes the substitution source string included in the target string extracted by the searching of the substitution source string search unit 28 with the substitution destination string mapped onto the substitution source string.

The matching processing unit 20 collates data that went through the string conversion by the DFA substitution unit 18 by a record unit, computes an accuracy which corresponds to the data of the same person in a group that went through the collation, and extracts a group having a relatively high accuracy which corresponds to data of the same person. The matching result unification unit 22 regards the group of data of which the computed accuracy is the threshold or more among the groups of the extracted data as the data of the same person and unifies the group of data.

Figure 2:
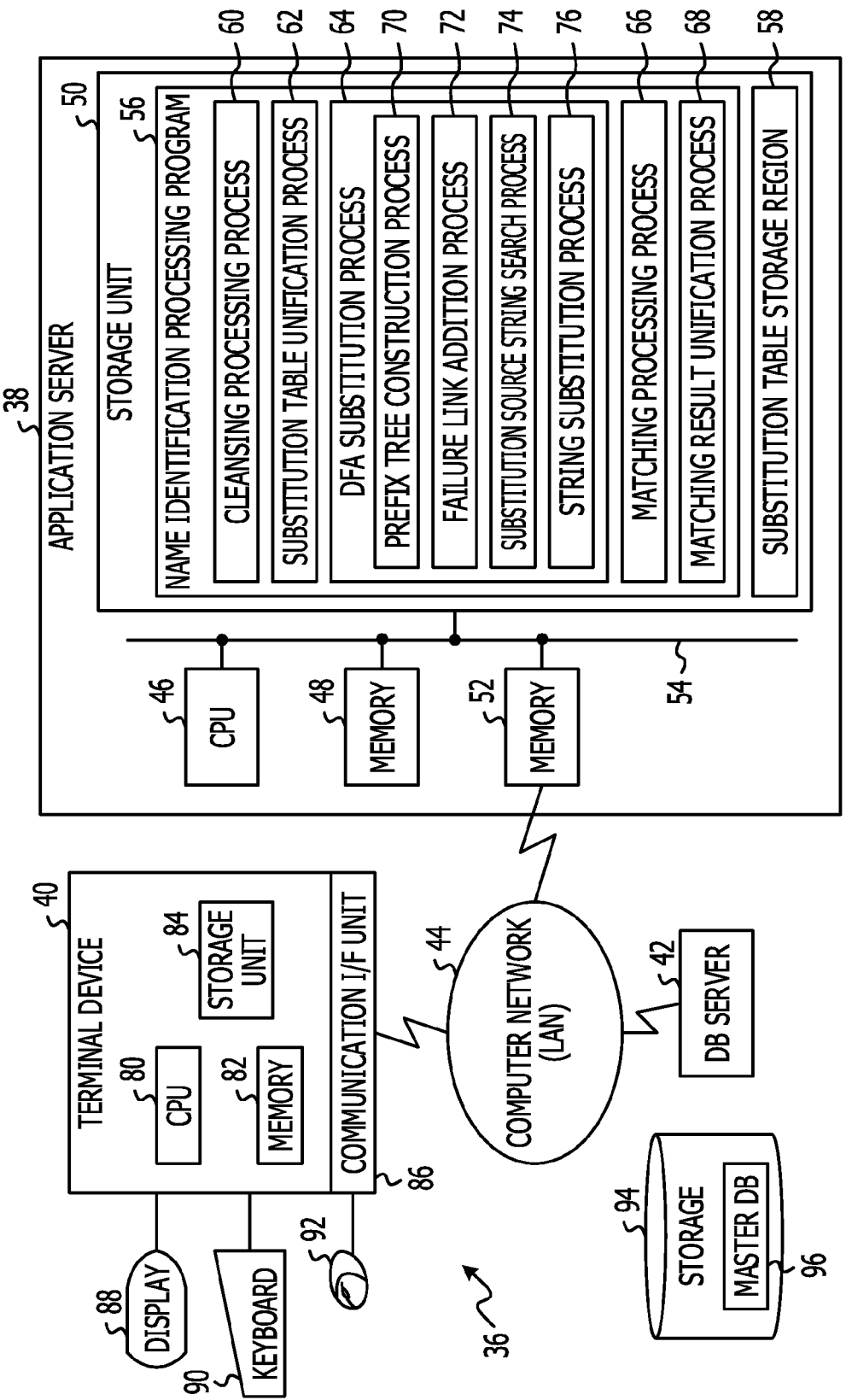
FIG. 2 is a block diagram schematically illustrating a computer system including an application server which serves as the name identification processing device.

The name identification processing device 10 can be implemented in an application server 38 included in a computer system 36 illustrated in FIG. 2. The computer system 36 includes the application server 38, a terminal device 40 and a DB server 42 that are coupled with one another through a computer network 44. Further, although only one terminal device 40 is illustrated in FIG. 2, a plurality of terminal devices 40 may be installed.

Further, the substitution table unification unit 16 is an example of a unification unit, and the prefix tree construction unit 24 of the DFA substitution unit 18 is an example of a prefix tree construction unit in the disclosed technique. The failure link addition unit 26 of the DFA substitution unit 18 is an example of a failure link addition unit and the substitution source string search unit 28 of the DFA substitution unit 18 is an example of a substitution source string search unit in the disclosed technique. The string substitution unit of the DFA substitution unit 18 is an example of a substitution unit in the disclosed technique.

The application server 38 includes a CPU 46, a memory 48, a non-volatile storage unit 50 implemented by such as a hard disk drive (HDD) or a flash memory, and a communication interface (I/F) unit 52. The CPU 46, the memory 48, the storage unit 50 and the communication I/F 52 are coupled with one another through a bus 54, and the communication I/F 52 is coupled to the computer network 44.

The storage unit 50 serving as a recording medium stores a name identification processing program 56 which makes the application server 38 to function as the name identification processing device 10. The storage unit 50 is provided with a substitution table storage region 58. The CPU 46 reads out the name identification processing program 56 from the storage unit 50 and deploys the name identification processing program 56 onto the memory 48 to sequentially perform processes included in the name identification processing program 56.

The name identification processing program 56 includes a cleansing processing process 60, a substitution table unification process 62, a DFA substitution process 64, a matching processing process 66 and a matching result unification process 68. Further, the DFA substitution process 64 includes a prefix tree construction process 70, a failure link addition process 72, a substitution source string search process 74 and a string substitution process 76.

The CPU 46 executes the cleansing processing process 60 and thus, functions as the cleansing processing unit 12 as illustrated in FIG. 1. Further, the CPU 46 executes the substitution table unification process 62 and thus, functions as the substitution table unification unit 16 illustrated in FIG. 1. Further, the CPU 46 executes the DFA substitution process 64 and thus, functions as the DFA substitution unit 18 illustrated in FIG. 1. Further, the CPU 46 executes the matching processing process 66 and thus, functions as the matching processing unit 20 illustrated in FIG. 1. Further, the CPU 46 executes the matching result unification process 68 and thus, functions as the matching processing unit 20 illustrated in FIG. 1.

Further, the CPU 46 executes the prefix tree construction process 70 and thus, functions as the prefix tree construction unit 24 illustrated in FIG. 1. Further, the CPU 46 executes the failure link addition process 72 and thus, functions as the failure link addition unit 26 illustrated in FIG. 1. Further, the CPU 46 executes the substitution source string search process 74 and thus, functions as the substitution source string search unit 28 illustrated in FIG. 1. Further, the CPU 46 executes the string substitution process 76 and thus, functions as the string substitution unit 30 illustrated in FIG. 1. Further, the substitution table storage region 58 functions as the substitution table storage unit 14. Accordingly, the application server 38 which performed the name identification processing program 56 functions as the name identification processing device 10.

The terminal device 40 includes a CPU 80, a memory 82, a non-volatile storage unit 84 implemented by such as a HDD or a flash memory, and a communication I/F unit 86. The terminal device 40 is coupled with a display 88, a keyboard 90 and a mouse 92, and coupled to the computer network 44 through the communication I/F unit 86.

The DB server 42 is coupled to the computer network 44. Further, the DB server 42 is coupled with the storage 94 which stores the master DB 96. The storage 94 functions as the master DB storage unit 32 illustrated in FIG. 1

Next, as a feature of the present embodiment, when an instruction to perform the name identification processing for the master DB 96 is issued from a user through the terminal device 40, the name identification processing performed in the application server 38 is described with reference to FIG. 3.

At step 150 of the name identification processing, the cleansing processing unit 12 acquires a target data for name identification registered in the master DB 96 through the DB server 42. FIG. 4A illustrates an example of a target data for name identification acquired by the cleansing processing unit 12. The data illustrated in FIG. 4A includes data of a plurality of records and data in each record are set for each item of "id", "name" and "address".

At next step 152, the cleansing processing unit 12 performs a cleansing processing such as an address data normalization or address data supplementation, for the target data for name identification. FIG. 4B illustrates an example of data after the cleansing processing. As will be apparent from comparison with FIG. 4A, string "神奈川県" is added to "address" data of "id"=002, and string "東京都" is added to "address" data of "id"=003 in the data illustrated in FIG. 4B.

At next step 154, the substitution table unification unit 16 performs a substitution table unification processing. Hereinafter, the substitution table unification processing is described with reference to FIGS. 5A and 5B.

At step 170 of the substitution table unification processing, the substitution table unification unit 16 acquires the type and the number t of a target substitution table for unification and the application sequence of each table. In the present embodiment, when an instruction to perform the name identification processing is issued from a user through the terminal device 40, a type of the substitution table (a target for unification) and an application sequence applied to string substitution among the plural types of substitution tables are also indicated. The substitution table unification acquires the type and the number t of the target substitution table for unification and the application sequence from the terminal device 40. Further, the type and the number t of the target substitution table for unification and the application sequence are determined by the user according to the contents of the string substitution that the user wants to perform.

At next step 172, the substitution table unification unit 16 reads out a substitution table having a first application sequence among the t substitution tables as a target substitution table A for unification. Further, at step 174, the substitution table unification unit 16 sets number two (2) for a variable k. Also, at step 176, the substitution table unification unit 16 reads out a substitution table having a $k_{th}$ application sequence among the t substitution tables as a target substitution table B for unification.

At next step 178, the substitution table unification unit 16 sets number zero (0) for the variable i used to identify each substitution pattern (pattern in which a substitution source string is mapped to a substitution destination string) registered in the substitution table A. Further, at step 180, the substitution table unification unit 16 reads out the $i_{th}$ substitution pattern from the substitution patterns registered in the substitution table A.

At next step 182, the substitution table unification unit 16 sets number zero (0) for a variable j used to identify each substitution pattern registered in the substitution table B. Further, at step 184, the substitution table unification unit 16 reads out the $j_{th}$ substitution pattern from the substitution patterns registered in the substitution table B.

At next step 186, the substitution table unification unit 16 determines whether the $i_{th}$ substitution pattern read out from the substitution table A and the $j_{th}$ substitution pattern read out from the substitution table A correspond to a binding rule (1) illustrated in FIG. 6A. The binding rule (1) illustrated in FIG. 6A is a rule that a substitution source string in the $i_{th}$ substitution pattern (depicted by substitution pattern A in FIG. 6) in the substitution table A is identical to the substitution source string in the $j_{th}$ substitution pattern (depicted by substitution pattern B in FIG. 6) in the substitution table B.

When the determination result at step 186 is "YES", the process proceeds to step 188. At step 188, the substitution table unification unit 16 employs only the $i_{th}$ substitution pattern (substitution pattern A) as a new substitution pattern of a binding rule (1) and outputs the substitution pattern A to a unification substitution table. When the processing at step 188 is completed, the process proceeds to step 208.

When the determination result at step 186 is "NO", the process proceeds to step 190. At step 190, the substitution table unification unit 16 determines whether the $i_{th}$ substitution pattern read out from the substitution table A and the $j_{th}$ substitution pattern read out from the substitution table B correspond to a binding rule (2) illustrated in FIG. 6B. The binding rule (2) illustrated in FIG. 6B is a rule that a substitution destination string in the $i_{d}$ substitution pattern (substitution pattern A) in the substitution table A is identical to a substitution source string in the $j_{th}$ substitution pattern (substitution pattern B) in the substitution table B.

When the determination result at step 190 is "YES", the process proceeds to step 192. At step 192, the substitution table unification unit 16 employs a substitution pattern which converts a substitution source string in the $i_{th}$ substitution pattern of the substitution table A into a substitution destination string in the $j_{th}$ substitution pattern of the substitution table B as a new substitution pattern of the binding rule (2) and outputs the employed substitution pattern to the unification substitution table. When the processing at step 192 is completed, the process proceeds to step 208.

In the meantime, when the determination result at step 190 is "NO", the process proceeds to step 194. At step 194, the substitution table unification unit 16 determines whether the $i_{th}$ substitution pattern read out from the substitution table A and the $j_{th}$ substitution pattern read out from the substitution table B correspond to a binding rule (3) illustrated in FIG. 6C. The binding rule (3) illustrated in FIG. 6C is a rule that a substitution destination string in the $i_{th}$ substitution pattern (substitution pattern A) in the substitution table A includes a substitution source string in the $j_{th}$ substitution pattern (substitution pattern B) of the substitution table B.

When the determination result at step 194 is "YES", the process proceeds to step 196. At step 196, the substitution table unification unit 16 employs the $j_{th}$ substitution pattern (substitution pattern B) of the substitution table B as a new substitution pattern of the binding rule (3). Further, the substitution table unification unit 16 also employs a substitution pattern which substitutes the substitution source string in the $i_{th}$ substitution pattern of the substitution table A with a new string as a new substitution pattern of the binding rule (3). The new string referred to here is a string in which a string not included in the substitution source string in the $j_{th}$ substitution pattern of the substitution table B among substitution destination string of the $i_{th}$ substitution pattern of the substitution table A is added to a substitution destination string in the $j_{th}$ substitution pattern of the substitution table B. Also, the employed two substitution patterns are output to the unification substitution table. When the processing at step 196 is completed, the process proceeds to step 208.

In the meantime, when the determination result at step 194 is "NO", the process proceeds to step 198. At step 198, the substitution table unification unit 16 determines whether the $i_{th}$ substitution pattern read out from the substitution table A and the $j_{th}$ substitution pattern read out from the substitution table B correspond to a binding rule (4) illustrated in FIG. 6D. The binding rule (4) illustrated in FIG. 6D is a rule that a substitution destination string in the $i_{th}$ substitution pattern (substitution pattern A) in the substitution table A is included in a substitution source string in the $j_{th}$ substitution pattern (substitution pattern B) in the substitution table B.

When the determination result at step 198 is "YES", the process proceeds to step 200. At step 200, the substitution table unification unit 16 employs the $i_{th}$ substitution pattern (substitution pattern A) of the substitution table A and the jth substitution pattern (substitution pattern B) of the substitution table B as a new substitution pattern of the binding rule (4), respectively. Further, the substitution table unification unit 16 also employs a substitution pattern which substitutes a new string with the substitution destination string in the $j_{th}$ substitution pattern of the substitution table B as a new substitution pattern of the binding rule (4). The new string referred to here is a string in which a string not included in the substitution destination string in the $i_{th}$ substitution pattern of the substitution table A among substitution source string of the $j_{th}$ substitution pattern of the substitution table B is added to a substitution destination string in the $i_{th}$ substitution pattern of the substitution table A. The substitution table unification unit 16 outputs the employed three substitution patterns into the unification substitution table. When the processing at step 200 is completed, the process proceeds to step 208.

Further, when the determination result at step 198 is "NO", the process proceeds to step 202. At step 202, the substitution table unification unit 16 determines whether the variable j is smaller than the total number m of the substitution patterns registered in the substitution table B. When the determination result at step 202 is "YES", the process proceeds to step 204. At step 204, the substitution table unification unit 16 increments the variable j by one (1) and then, the process returns to step 184.

Accordingly, the processings from step 184 to step 204 are repeated until either any one of the determination results at step 186, step 190, step 194, and step 194 is "YES" or the determination result at step 202 is "NO". When a substitution pattern which corresponds to any one of the binding rules (1) to (4) for the $i_{th}$ substitution pattern of the substitution table A is present among m substitution patterns registered in the substitution table B, any one of the determination results at step 186, step 190, step 194, and step 194 is "YES".

Further, when a substitution pattern which corresponds to any one of the binding rules (1) to (4) for the $i_{th}$ substitution pattern of the substitution table A is not present among m substitution patterns registered in the substitution table B, the determination result at step 202 is "NO" and thus, the process proceeds to step 206. At step 206, the substitution table unification unit 16 outputs the $i_{th}$ substitution pattern of the substitution table A to the unification substitution table and thus, the process proceeds to step 208.

At step 208, the substitution table unification unit 16 determines whether the variable i is smaller than the total number n of the substitution patterns registered in the substitution table A. When the determination result at step 208 is "YES", the process proceeds to step 210. At step 210, the substitution table unification unit 16 increments the variable i by one (1) and then, the process returns to step 184. Accordingly, the processings from step 180 to step 210 are repeated until the determination result at step 208 is "NO", such that a group of substitution patterns which corresponds to any one of the binding rules (1) to (4) is found.

When the determination result at step 208 is "NO", the process proceeds to step 212. At step 212, the substitution table unification unit 16 sets zero (0) for the variable j. Further, at next step 214, the substitution table unification unit 16 reads out the $j_{th}$ substitution pattern among the substitution patterns registered in the substitution table B.

At step 216, the substitution table unification unit 16 determines whether the $j_{th}$ substitution pattern read out from the substitution table B corresponds to any one of the binding rules (1) to (4) in a loop constituted with the previous steps from step 180 to step 210. When the determination result at step 216 is "YES", the process proceeds to step 220. Further, when the determination result at step 216 is "NO", the process proceeds to step 218. At step 218, the substitution table unification unit 16 outputs the jth substitution pattern read out from the unification substitution table B to the unification substitution table, and then the process proceeds to step 220.

At next step 220, the substitution table unification unit 16 determines whether the variable j is smaller than the total number m of the substitution patterns registered in the substitution table B. When the determination result at step 220 is "YES", the process proceeds to step 222. At step 222, the substitution table unification unit 16 increments the variable j by one (1) and then, the process returns to step 214. Accordingly, the processings from step 214 to step 222 are repeated until the determination result at step 220 is "NO".

When the determination result at step 220 is "NO", the process proceeds to step 224. At step 224, the substitution table unification unit 16 determines whether the value of the variable k reaches the number t of a target substitution table for unification. When the determination result at step 224 is "NO", the process proceeds to step 226. At step 226, the substitution table unification unit 16 reads out the unified substitution table as a substitution table A. At next step 228, the substitution table unification unit 16 increments the variable k by one (1) and then, the process returns to step 176.

Figure 8:
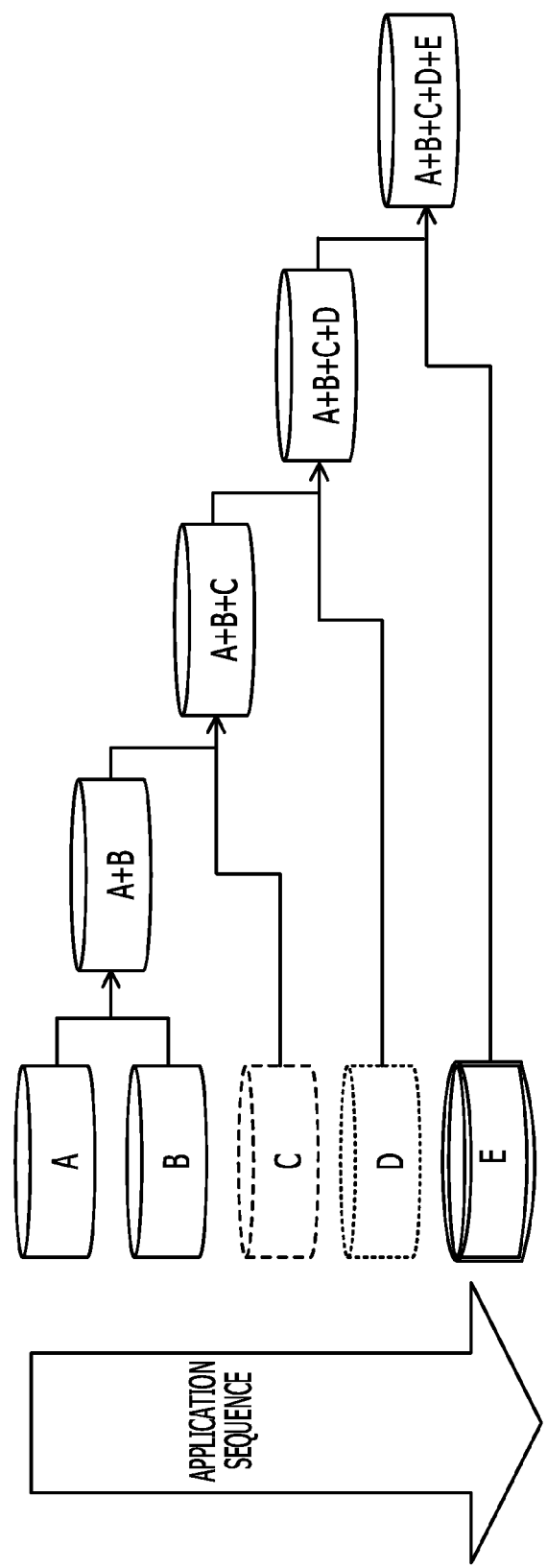
FIG. 8 is a schematic diagram illustrating binding rules in unification of the substitution tables.
Figure 9:
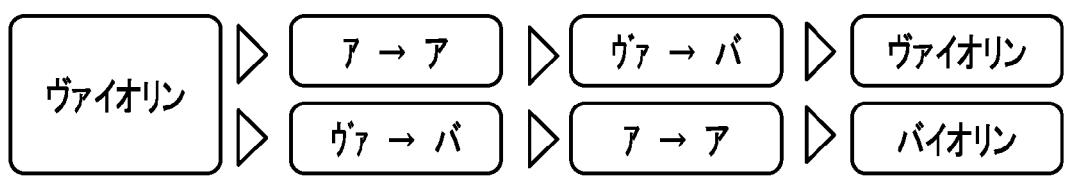
FIG. 9 is a schematic diagram illustrating that a result of a string substitution processing is different depending on the application sequence of plural types of substitution tables for unification.

Accordingly, the processings from step 176 to step 228 are repeated until the determination result at step 224 is "YES". Therefore, according to the processings as describe above, for example, as illustrated in FIG. 7, a single unification substitution table (substitution table for execution) is generated in which plural substitution tables selected as target substitution tables for unification among the plural substitution tables stored in the substitution table storage unit 14 are unified. Further, plural substitution tables selected as target substitution tables for unification unified according to an application sequence instructed from the user, for example, as illustrated in FIG. 8.

The reason why the plurality of substitution tables are unified according to the application sequence instructed is that there is a case where a result of a string substitution processing may be different according to the application sequence of a substitution table. For example, as illustrated in FIG. 8, it is assumed that a string substitution is performed with respect to a string "ヴァイオリン". When the application sequence of a first substitution table which includes a substitution pattern "ァ"→"ア" is prior to a second substitution table which includes a substitution pattern "ヴァ"->"バ", the string "ヴァイオリン" is substituted with a string "ヴァイオリン". In the meantime, when the application sequence of the first substitution table is prior to that of the second substitution table, the string "ヴァイオリン" is substituted with a string "バイオリン".

Figure 3:
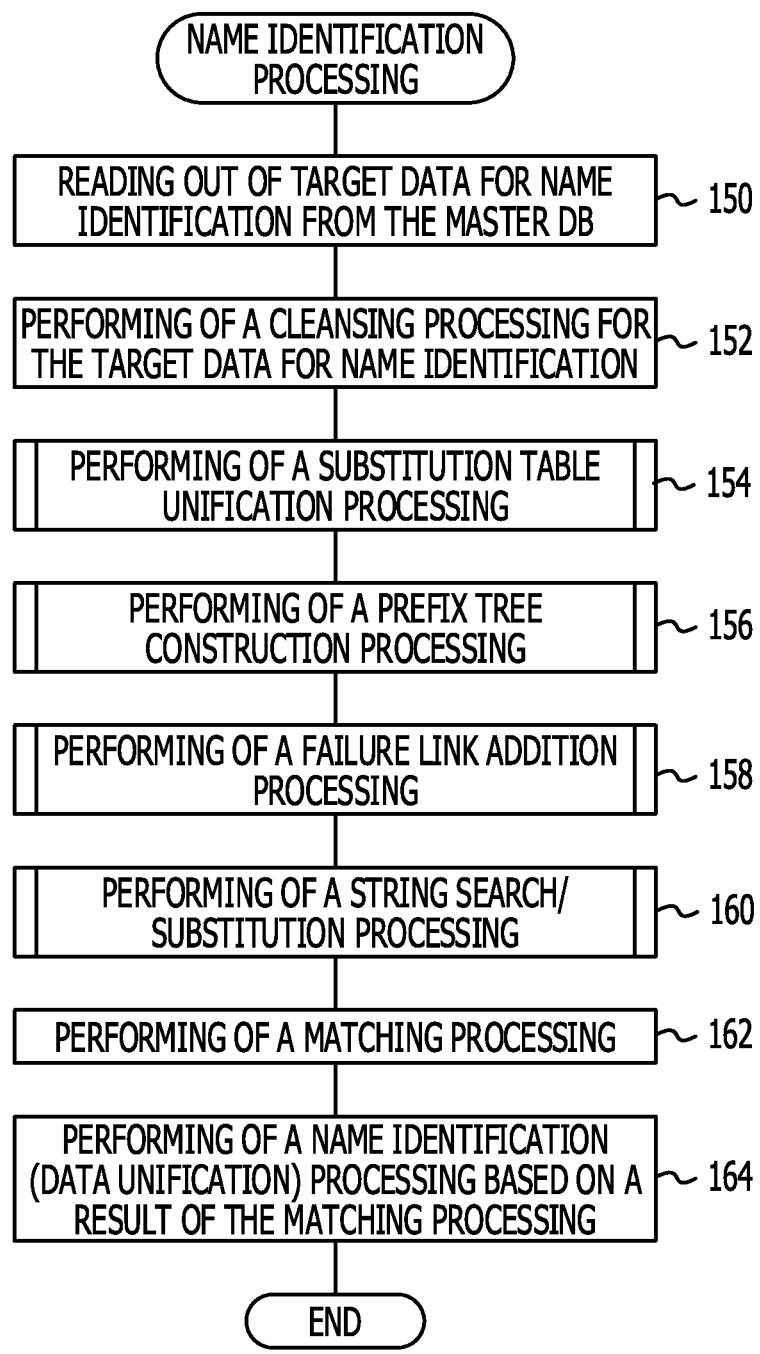
FIG. 3 is a flowchart illustrating an example of a name identification processing.
Figure 5A:
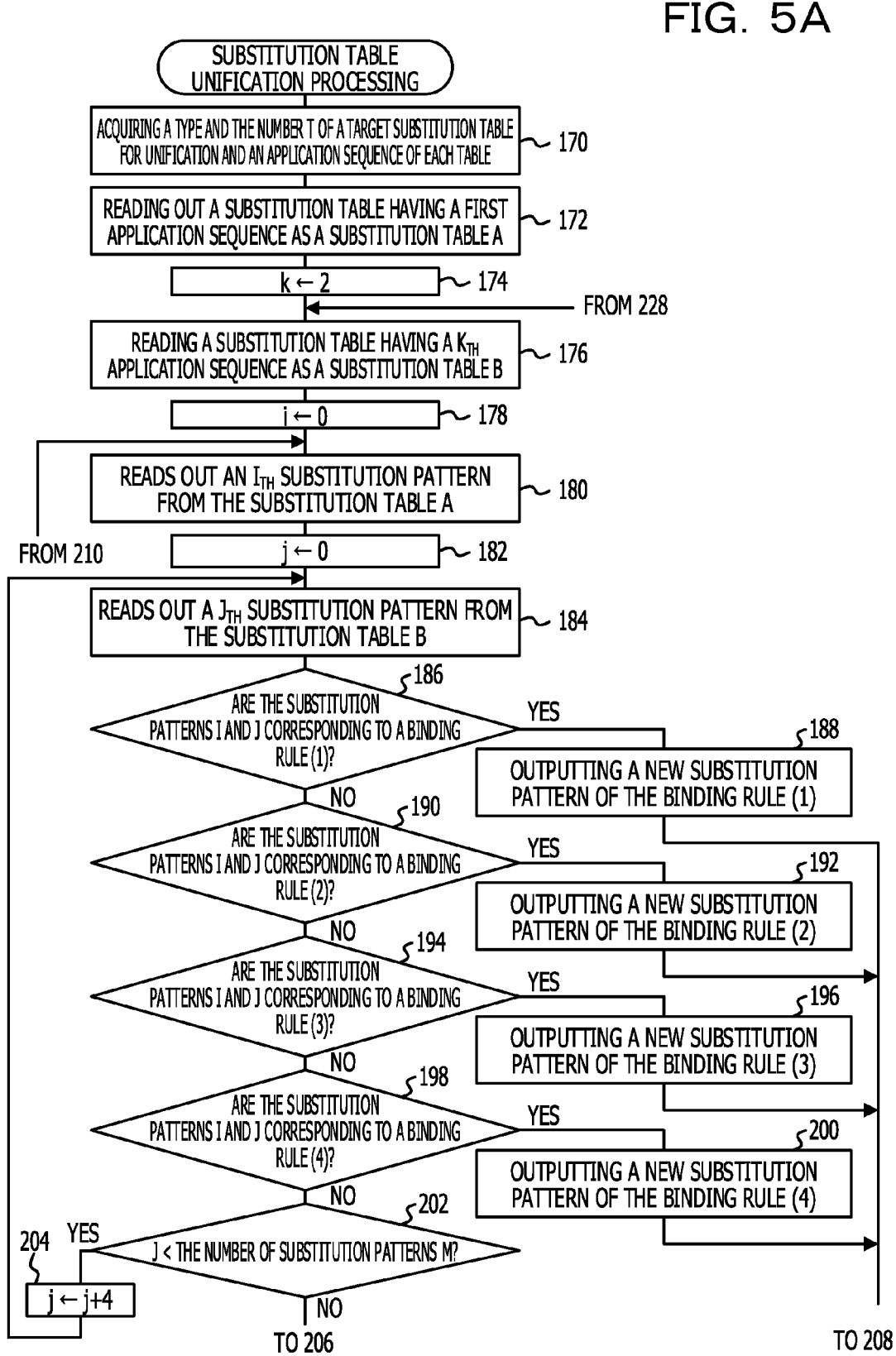
FIGS. 5A and 5B are flowcharts illustrating an example of a substitution table unification processing.
Figure 5B:
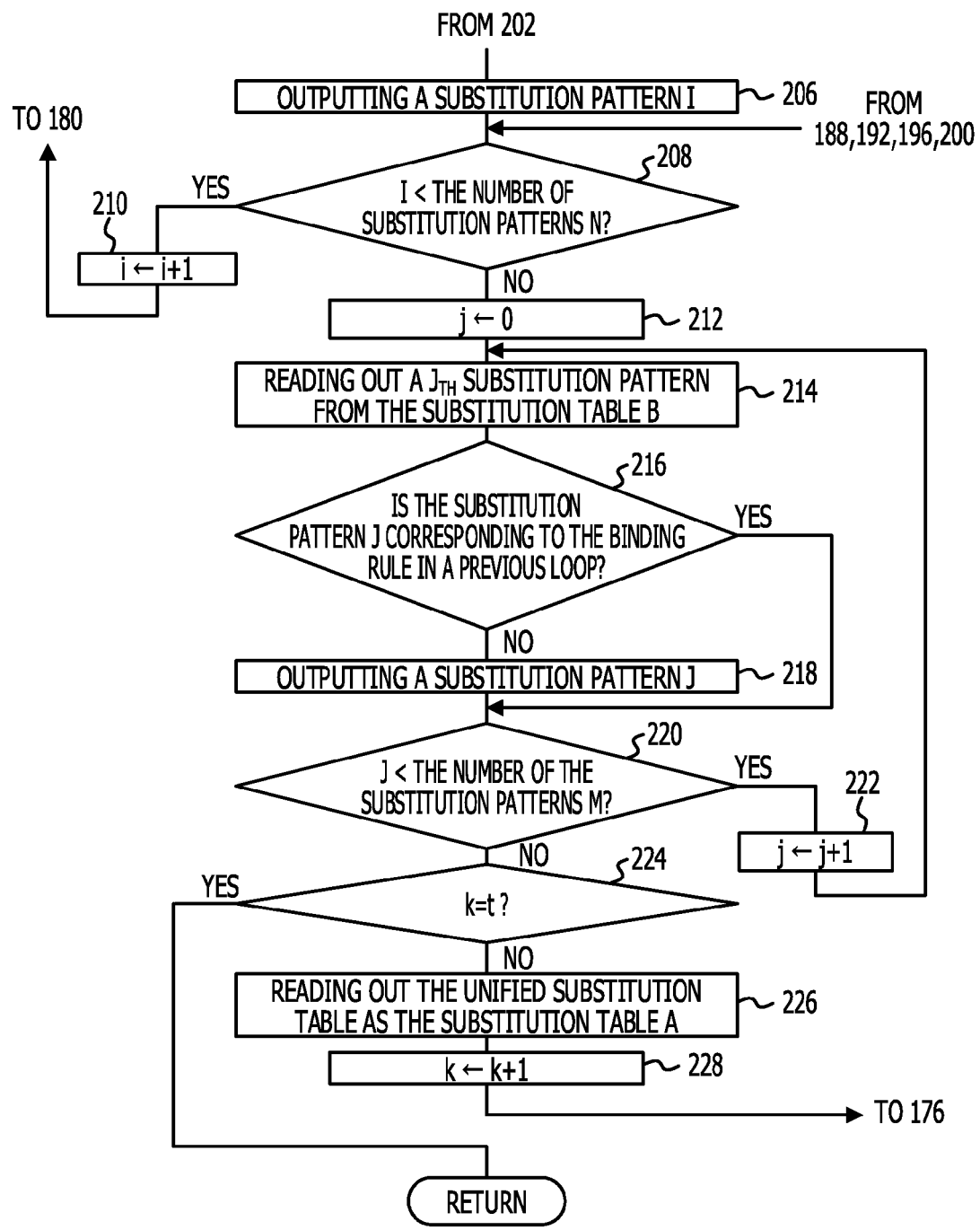
Figure 10:
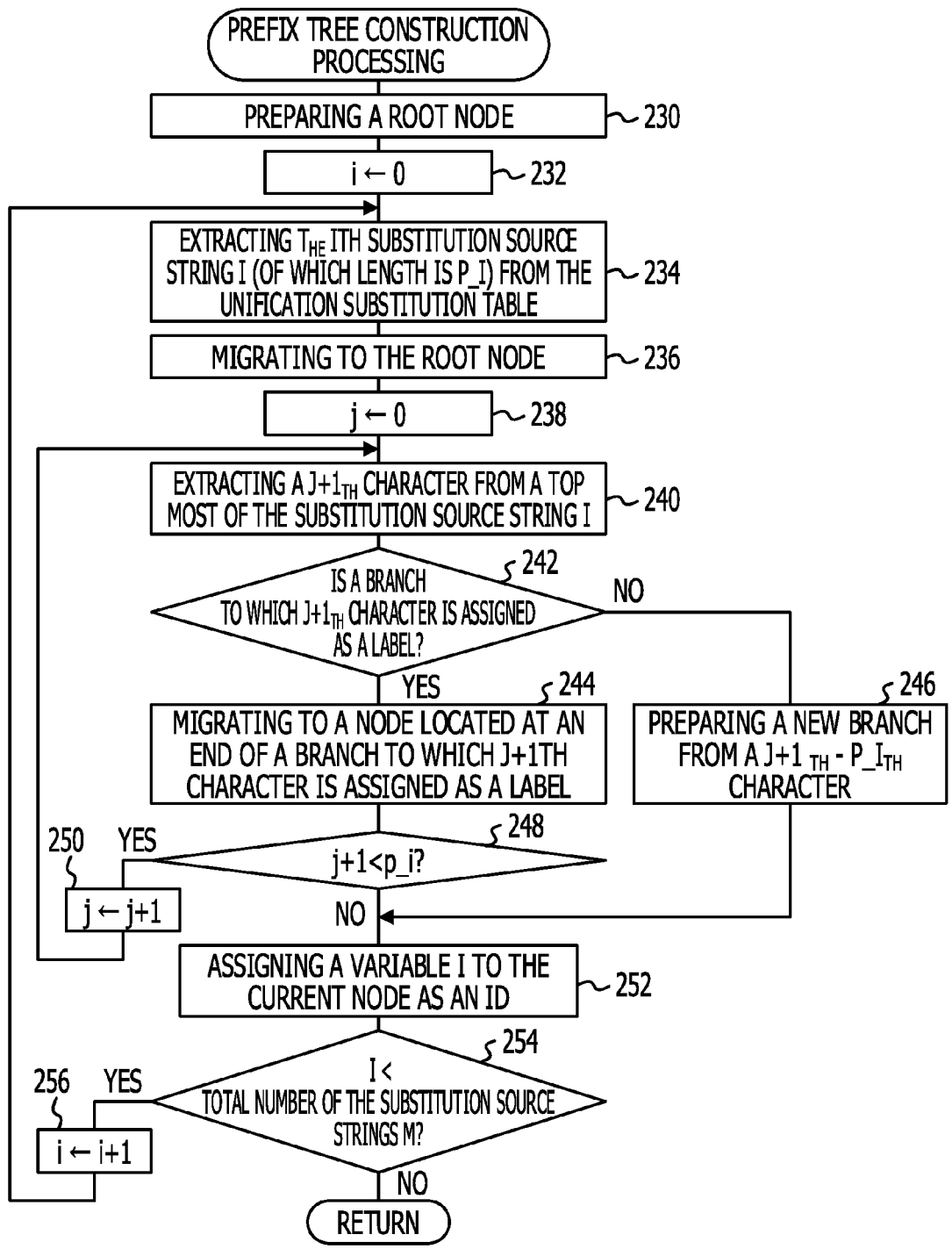
FIG. 10 is a flowchart illustrating an example of a prefix tree construction processing.

When the substitution table unification processing illustrated in FIGS. 5A and 5B are completed, the process proceeds to step 156 of the name identification processing illustrated in FIG. 3. At step 156, the prefix tree construction unit 24 performs a prefix tree construction processing. Hereinafter, the prefix tree construction processing is described with reference to FIG. 10.

At step 230 of the prefix tree construction processing, the prefix tree construction unit 24 first prepares a root node (see also the root node 100 illustrated in FIG. 11) of a prefix tree. At next step 232, the prefix tree construction unit 24 sets zero (0) for a variable i used to identify each substitution source string. At step 234, the prefix tree construction unit 24 extracts the $i_{th}$ substitution source string i (of which length is p_i) from the unification substitution table (substitution table unified by the previous substitution table unification processing).

At next step 236, the prefix tree construction unit 24 migrates to the root node 100 prepared at previous step 230. At next step 238, the prefix tree construction unit 24 sets zero (0) for a variable j used to identify a position of character extracted from the substitution source string i. At next step 240, the prefix tree construction unit 24 extracts a character positioned at j+1th from a top most of the substitution source string i.

At step 242, the prefix tree construction unit 24 determines whether a branch to which j+1th character extracted at step 240 is assigned as a label among branches each of which having one end connected to a current node (in this case, root node) is present or not. Since a branch itself is not present at an initial time when the prefix tree construction processing is initiated, the determination result at step 242 is "NO", and the process proceeds to step 246.

Figure 11:
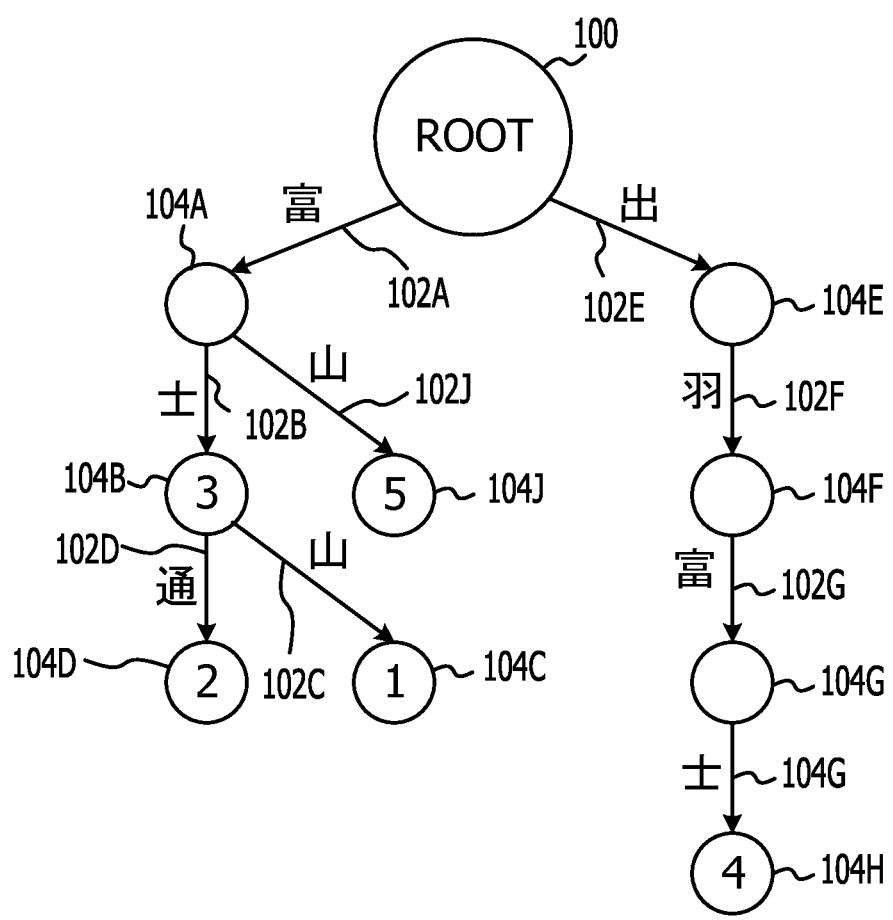
FIG. 11 is a schematic diagram illustrating an example of the constructed prefix tree.

At step 246, the prefix tree construction unit 24 prepares a new branch having characters each of which assigned from j+1~p_ith from a top most of the substitution source string i is assigned as a label and a new node. For example, as illustrated in FIG. 11, when the substitution source string is "富 上山" (Mt. Fuji), three branches 102A, 102B and 102C to each of which each character of "富", "上", "山" is assigned as a label are prepared while a total of three nodes 104A, 104B and 104C located at front end of each branch are prepared. Further, the prefix tree construction unit 24 migrates to a node located at a front end of among a group of prepared branches and nodes.

When the processing at step 246 is completed, the process proceeds to step 252. At step 252, the prefix tree construction unit 24 assigns a variable i to the current node as an ID (an example of identification information in the disclosed technique). Therefore, in the example illustrated in FIG. 11, ID=1 is assigned to a node 104C located at an end of a path which traverses the three branches 102A, 102B and 102C to each of which each character of "富", "上", "山" is assigned from the root node 100 as a label.

At next step 254, the prefix tree construction unit 24 determines whether the variable i is smaller than the total number M of the substitution source strings registered in the unification substitution table. When the determination result at step 254 is "YES", the process proceeds to step 256. At step 256, the prefix tree construction unit 24 increments the variable i by 1 (one) and then, the process returns to step 234.

Here, as illustrated in FIG. 11, when the next substitution source string i is "富士通"(FUJITSU), at step 240, a character "富" is extracted as a j+1th character from a front end of the substitution source string. At this time, since there is a branch 102A to which the character "富" is assigned as a label among the branches each of having one end connected the root node, the determination result at step 242 is "YES", and thus process proceeds to step 244. At step 244, the prefix tree construction unit 242 migrates to a node located at an end of a branch to which j+1th character is assigned as a label. In this case, the prefix tree construction unit 242 migrates to node 104A.

At next step 248, the prefix tree construction unit 242 determines whether the value of the variable j+1 is less than the length p_i of the substitution source string i. When the determination result at step 248 is "YES", the process proceeds to step 250. At step 250, the prefix tree construction unit 242 increments the value of variable j by 1 (one) and then, returns to step 240.

When the next substitution source string i is "富士通", a character "士" is extracted as a j+1th character from a front end of the substitution source string. At this time, since there is a branch 102B to which the character "士" is assigned as a label among the branches each of which having one end connected to a node 104A, the determination result at step 242 is "YES", and thus process proceeds to step 244. At step 244, the prefix tree construction unit 242 migrates to a node located at end of a branch to which j+1th character is assigned as a label. In this case, the prefix tree construction unit 242 migrates to a node 104B.

Subsequently, at step 240 after that went through the processings from step 248 and step 250, a character "通" is extracted as a $j+1_{th}$ character from a front end of the substitution source string. At this time, since there is no branch to which the character "通" is assigned as a label among the branches of which one end is connected to the node 104B, the determination result at step 242 is "NO", and thus the process proceeds to step 246. Accordingly, at step 246, a node 104D located at the front end of a branch 102D is prepared while the branch 102D to which the character "通" is assigned as a label is prepared. Further, at step 252, ID=2 is assigned to a node 104D located at an end of a path which traverses the three branches 102A, 102B and 102C to each of which each character of "富", "士", "通" is assigned from the root node 100 as a label.

Subsequently, when the next substitution source string i is "富士", characters "富" and "士" are extracted sequentially from a front end of the substitution source string i. At this time, since there are a branch 102A to which the character "富" is assigned as a label among the branches each of which having one is connected to the root node 100 and a branch 10213 to which the character "士" is assigned as a label among the branches each of which having one end connected to the node 104A. Therefore, the determination result at step 248 is "NO", and thus process proceeds to step 252. Also, at step 252, ID=3 is assigned to a node 104B located at an end of a path which traverses two branches 102A and 102B to each of which each character of "富" and "士" are assigned from the root node 100 as a label, respectively.

Similarly also in the following, when the next substitution source string i is "出羽富士", a characters "山" is extracted from a front end of the substitution source string i, but there is no branch to which the character "山" is assigned as a label among the branches each of which having one end connected to the root node 100. Accordingly, the determination result at step 242 is "NO", four nodes 104E, 104F, 104G and node 104H located at the front end of each of four branches 102E, 102F, 102G, and 102H are prepared while the branches 102E, 102F, 102G, and 102H to each of which each character of "出", "羽", "富", "士" are assigned as a label, respectively, are prepared. Also, ID=4 is assigned to a node 104H located at an end of a path which traverses four branches 102E, 102F, 102G, and 102H to each of which each character of "出", "羽", "富", "士" are assigned from the root node 100 as a label, respectively.

Further, when the next substitution source string i is "富山" (TOYAMA), characters "富" and "山" are extracted sequentially from a front end of the substitution source string i. At this time, there is no branch to which the character "山" is assigned as a label among the branches each of which having one end connected to the node 104A while there is a branch 102A to which the character "富" is assigned as a label among the branches each of which having one end connected to the root node 100. Accordingly, a node 1043 located at the front end of a branch 1023 is prepared while the branch 1023 to each of which each character of "山" is assigned as a label is prepared. Also, ID=5 is assigned to a node 1043 located at an end of a path which traverses two branches 102A and 1023 to each of which each character of "富" and "山" are assigned from the root node 100 as a label, respectively.

Figure 12:
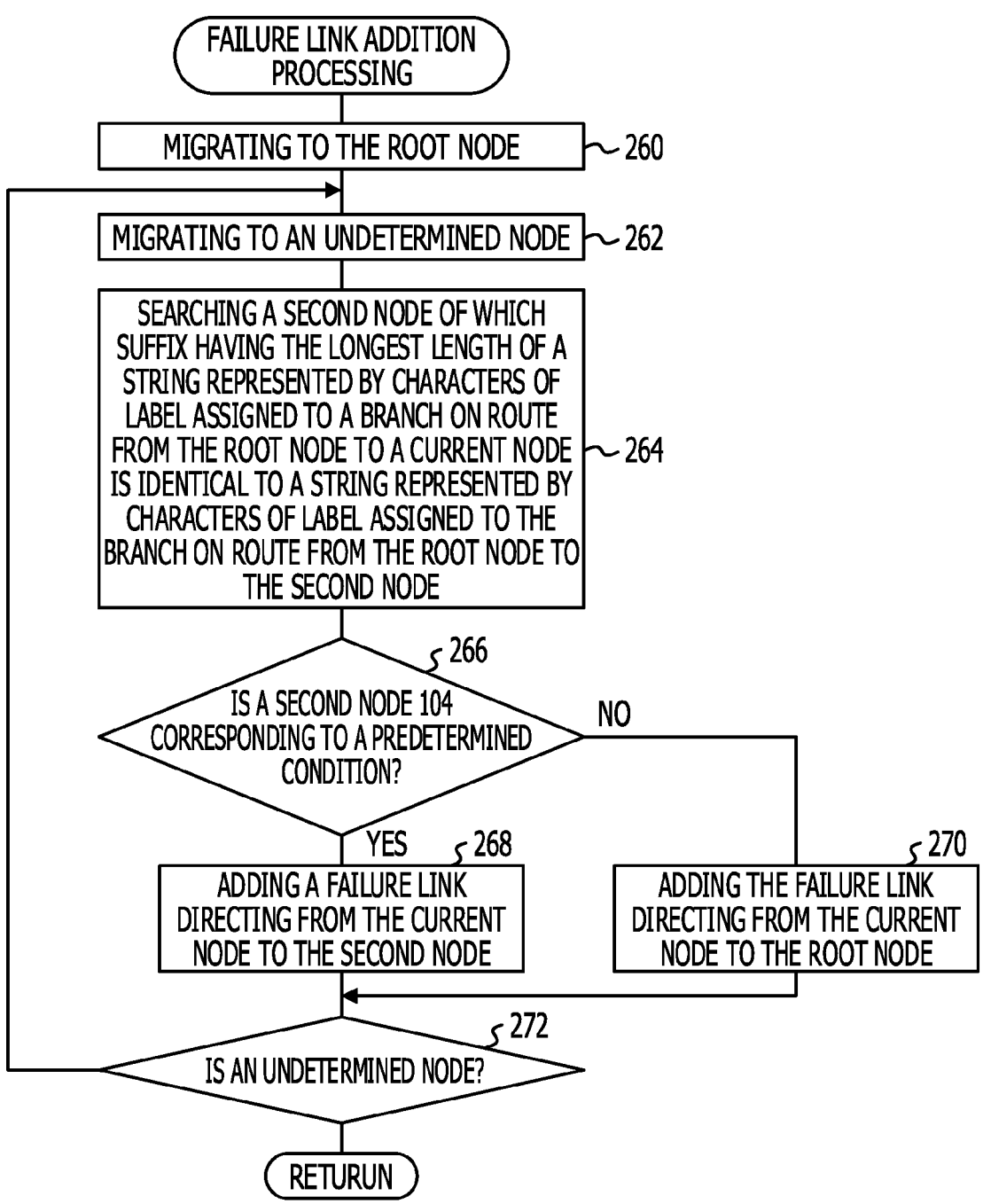
FIG. 12 is a flowchart illustrating an example of a failure link addition processing.

When all substitution source strings registered in the unification substitution table are extracted, the determination result at step 254 is "NO" and thus, the prefix tree construction processing is completed. Accordingly, a prefix tree is constructed to incorporate the substitution source strings registered in the unification substitution table. When the prefix tree construction processing is completed, the process proceeds to step 158 of the name identification processing. At step 158, a failure link addition unit 26 performs a failure link addition processing. Herein after, the failure link addition processing is described with reference to FIG. 12.

At step 260 of the failure link addition processing, the failure link addition unit 26 migrates to the root node 100 of a prefix tree constructed by the prefix tree construction unit 24. At next step 262, the failure link addition unit 26 changes a target for failure link addition from a current node to a node 104 which is not yet determined. At step 264, the failure link addition unit 26 searches a second node 104 which satisfies a predetermined condition for the current node 104. The predetermined condition means that a suffix having the longest length of a string represented by characters of label assigned to a branch 102 on route from the root node to a current node 104 is identical to a string represented by characters of label assigned to the branch 102 on route from the root node to the second node 104.

At next step 266, the failure link addition unit 26 determines whether a second node 104 which corresponds to the predetermined condition is found by searching performed at step 264. When the determination result at step 266 is "YES", the process proceeds to step 268. At step 268, the failure link addition unit 26 adds a failure link 106 directing from the current node 104 to the second node 104. Further, the determination result at step 266 is "NO", the process proceeds to step 270. At step 270, the failure link addition unit 26 adds the failure link 106 directing from the current node 104 to the root node 100.

Figure 13:
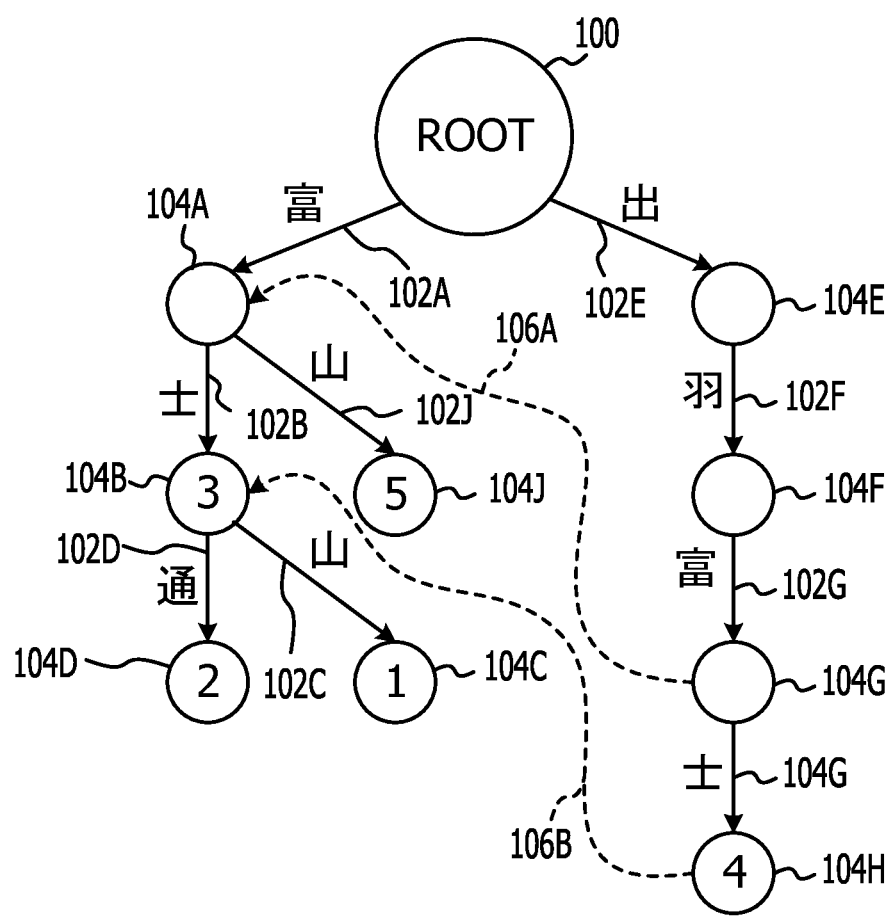
FIG. 13 is a schematic diagram illustrating an example of a failure link added to the prefix tree.

Specifically, for example, when the current node is a node 104G illustrated in FIG. 13, a string represented by characters of label assigned to the branch 102 on route from the root node 100 to the current node 104G is "山羽富". In the meantime, a string represented by a character of label assigned to the branch 102A on route from the root node 100 to a node 104A is "富" and string "富" is identical to a suffix having the longest length "富". In this case, the determination result at step 266 is "YES" and thus, a failure link 106A directing from the current node 104G to the node 104A serving as a second node is added.

Further, for example, when the current node is a node 104H illustrated in FIG. 13, a string represented by characters of label assigned to the branch 102 on route from the root node 100 to the current node 104H is "出羽富士". In the meantime, a string represented by a character of label assigned to the branch 102A on route from the root node 100 to a node 104B is "富士" and a string "富士" are identical to a suffix having the longest length "富士". Also, in this case, the determination result at step 266 is "YES" and thus, a failure link 106B directing from the current node 104H to the node 104B serving as a second node is added.

Since there is no second node which satisfies the predetermined condition with respect to the other node 104 illustrated in FIG. 13, the determination result at step 266 is "NO" and thus, the failure links 106 directing from the respective nodes 104 to the root node 100 are added. Further, in FIG. 13, the depiction of the failure links 106 directing from the respective other nodes 104 to the root node 100 are omitted in order to avoid complication of the drawing.

When the determination processing at step 268 or step 270 is performed, the process proceeds to step 272. At step 272, the failure link addition unit 26 performs a breadth-first search to determine whether there is an undetermined node for a failure link addition or not. When the determination result at step 272 is "YES", the process proceeds to step 262 and the processes from step 262 to step 272 are repeated until the determination result at step 272 is "NO". When the determination result at step 272 is "NO", the failure link addition processing is completed.

Figure 14:
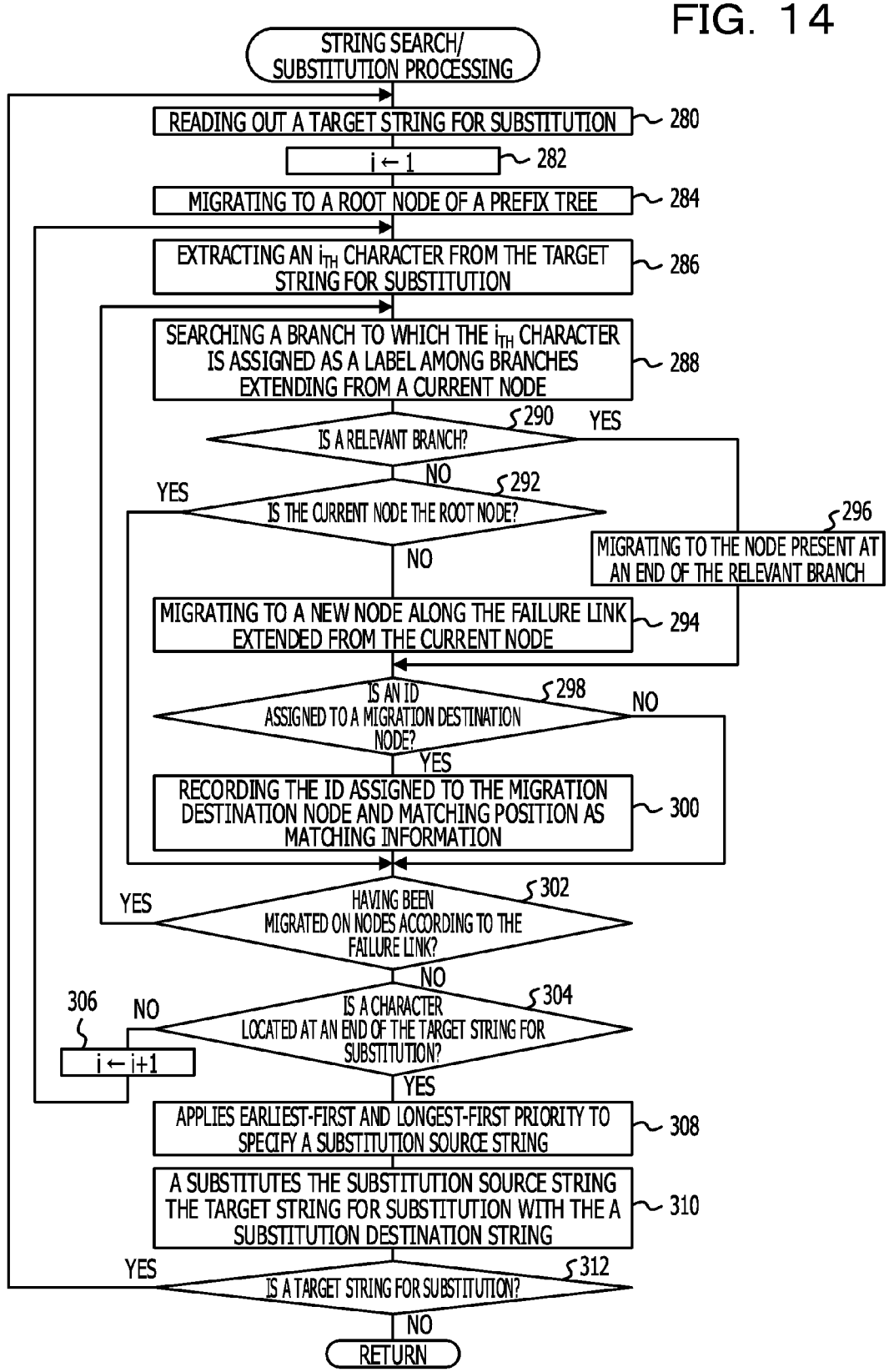
FIG. 14 is a flowchart illustrating an example of a string search/substitution processing.

When the failure link addition processing is completed, the process proceeds to step 160 of the name identification processing illustrated in FIG. 3. At step 160, the substitution source string search unit 28 and the string substitution unit 30 performs a string search/substitution processing. Hereinafter, the string search/substitution processing is described with reference to FIG. 14.

At step 280 of the string search/substitution processing, the substitution source string search unit 28 reads out data having been that went through the cleansing processing by the cleansing processing unit as a target string. At next step 282, the substitution source string search unit 28 sets 1 (one) for variable i used for identifying a position of a target character for processing in the target string. Further, at step 284, the substitution source string search unit 28 migrates to the root node 100 of the prefix tree which is constructed by the prefix tree construction unit 24 and to which a failure link is added by the failure link addition unit 26.

At next step 286, the substitution source string search unit 28 extracts a character located at an $i_{th}$ character from a top most of the target string. At next step 288, the substitution source string search unit 28 searches a branch to which the $i_{th}$ character extracted at step 286 is assigned as a label among branches extending from a current node. At next step 290, the substitution source string search unit 28 determines whether the relevant branch is found by searching performed at step 288 or not.

When the determination result at step 290 is "YES", the process proceeds to step 296. At step 296, the substitution source string search unit 28 migrates to the node 104 present at an end of the relevant branch found by searching performed at step 288, and the process proceeds to step 298. Further, when the determination result at step 290 is "NO", the process proceeds to step 292. At step 292, the substitution source string search unit 28 determines whether the current node is the root node 100. When the determination result at step 292 is "YES", the process proceeds to step 294. At step 294, the substitution source string search unit 28 migrates to a new node 104 along the failure link 106 extended from the current node 104, and the process proceeds to step 298.

At step 298, the substitution source string search unit 28 determines whether an ID is assigned to a migration destination node 104 in the migration of node performed at step 296 or step 294. When the determination result at step 298 is "NO", the process proceeds to step 302. Further, when the determination result at step 298 is "YES", the process proceeds to step 300. At step 300, substitution source string search unit 28 records the ID assigned to the migration destination node 104 and matching position (difference between a position of a current character in the target string and a distance from the root node 100) as matching information, and the process proceeds to step 302. Further, when the determination result at previous step 292 is "YES", a failure link from the root node 100 is not added to the root node 100 and thus, the process proceeds to step 302.

At step 302, it is determined whether the substitution source string search unit 28 migrates on nodes according to the failure link due to the processing described above (performs a processing at step 294). When the determination result at step 302 is "YES", the process returns to step 288, and the substitution source string search unit 28 re-searches a branch to which the $i_{th}$ character is assigned as a label. Further, when the determination result at step 302 is "NO", the process returns to step 304.

At step 304, the substitution source string search unit 28 determines whether the character extracted at previous step 286 is a character located at an end of the target string. When the determination result at step 304 is "NO", the process proceeds to step 306. At step 306, the substitution source string search unit 28 increments the variable i by one (1) and then, the process returns to step 286. Accordingly, the processings from step 286 to step 306 are repeated until the determination result at step 186 is "NO".

With respect to the processings from step 286 to step 306, a case where a prefix tree for which a failure link is occurred illustrated in FIG. 13 is used and a string "出羽富士山富士山" is used as a target string is described again as an example.

First, a first character "出" from the target string "出羽富士山富士山" is extracted and a branch 102E is extracted according to a searching performed at step 288 and the substitution source string search unit 28 migrates to a node 104E. Since an ID is not yet assigned to the node 104E, the determination result at step 298 is "NO".

Subsequently, a second character "羽" from the target string "出羽富士山富士山" is extracted and a branch 102F is extracted according to the searching performed at step 288 and the substitution source string search unit 28 migrates to a node 104F. Since an ID is not yet assigned to the node 104F, the determination result at step 298 is "NO".

Subsequently, a third character "富" from the target string "出羽富士山富士山" is extracted and a branch 102G is extracted according to the searching performed at step 288 and the substitution source string search unit 28 migrates to a node 104G. Since an ID is not yet assigned to the node 104G, the determination result at step 298 is "NO".

Subsequently, a fourth character "士" from the target string "出羽富士山富士山" is extracted and a branch 102H is extracted according to the searching performed at step 288 and the substitution source string search unit 28 migrates to a node 104H. Since an ID=4 is assigned to the node 104H, the determination result at step 298 is "YES", and the ID=4 and a matching position=0 are recorded as matching information.

Subsequently, a fifth character "山" from the target string "出羽富上山富上山" is extracted and a relevant branch is not extracted in the searching performed at step 288 and the substitution source string search unit 28 migrates to the node 104B along the failure link 106B. Since an ID=3 is assigned to the node 104B, the determination result at step 298 is "YES", and the ID=3 and a matching position=2 is recorded as matching information. Further, the determination result at step 302 is "YES" and thus, the substitution source string search unit 28 re-searches a branch to which the character "山" is assigned as a label. As a result, the branch 102C is extracted, and the substitution source string search unit 28 migrates to the node 104C. Since an ID=1 is assigned to the node 104C, the determination result at step 298 is "YES", and the ID=1 and a matching position=2 are recorded as matching information.

Subsequently, a sixth character "富" from the target string "出羽富士山富士山" is extracted and a relevant branch is not extracted in the searching performed at step 288 and the substitution source string search unit 28 migrates to the root node 100 along the failure link which is not illustrated. Further, the determination result at step 302 is "YES" and thus, the substitution source string search unit 28 re-searches a branch to which the character "富" is assigned as a label. As a result, the branch 102A is extracted, and the substitution source string search unit 28 migrates to the node 104A. Since an ID is not assigned to the node 104A, the determination result at step 298 is "NO".

Subsequently, a seventh character "士" from the target string "出羽富上山富上山" is extracted and the branch 102B is extracted according to the searching performed at step 288 and the substitution source string search unit 28 migrates to the node 104B. Since an ID=3 is assigned to the node 104B, the determination result at step 298 is "YES", and the ID=3 and a matching position=5 are recorded as matching information.

Subsequently, an eighth character "上" from the target string "出羽富士山富士山" is extracted and the branch 102C is extracted according to the searching performed at step 288 and the substitution source string search unit 28 migrates to the node 104C. Since an ID=1 is assigned to the node 104C, the determination result at step 298 is "YES", and the ID=1 and a matching position=5 are recorded as matching information.

As described above, when the searching for the substitution source string included in the target string is completed, the determination result at step 304 is "YES", and process proceeds to step 308. At step 308, the substitution source string search unit 28 applies earliest-first and longest-first priority to specify a substitution source string. For example, a substitution source string and corresponding matching information extracted from the previous example are the same as those represented in the following Table 1.

TABLE 1

| substitution source string | matching information | |
|---|---|---|
| | ID | matching position |
| <<出羽富士>>山富士山 | 4 | 0 |
| 出羽<<富士>>山富士山 | 3 | 2 |
| 出羽<<富士山>>富士山 | 1 | 2 |
| 出羽富士山<<富士>>山 | 3 | 5 |
| 出羽富士山<<富士山>> | 1 | 5 |

With respect to matching information (4,0), (3,2) and (1,2) which correspond to a first row, a second row, and a third row, respectively, in table 1, matching information (4,0) is located at a foremost on a target string and a length of the substitution source string is the longest, and thus, a substitution source string "出羽富上" which mapped to the matching information (4,0) is selected. Further, with respect to matching information (3,5) and (1,5) in table 1, a length of the substitution source string of the matching information (1,5) is longer than that of the matching information (3,5) and thus, a substitution source string "富上山" which mapped to the matching information (1,5) is selected. As the result, the first to the fourth characters "出羽富上" and the sixth to the eighth characters "富士山" among the target string "出羽富士山富士山" are specified as the substitution source strings (<<出羽富上>>山<<富士山>>).

At next step 310, string substitution unit 30 substitutes the substitution source strings specified at step 308 among the target string with the substitution destination strings mapped onto the substitution source string and registered in the unification substitution table, respectively. As described above, the unification substitution table is configured such that the substitution patterns registered in plural types of substitution tables is unified and thus, a substitution of string is performed based on the substitution pattern in which plural types of substitution patterns are unified by the string substitution performed once at step 310. For example, an example of result from the string search/substitution processing performed for data illustrated in FIG. 4B is illustrated in FIG. 4C. Data illustrated in FIG. 4C is apparent from comparison with FIG. 4B, a substitution for a voiced consonant removal and a substitution from a string "ウエア" to a string "ウエア" are performed for a string of "name" corresponding to data of "id"=001. Further, a substitution for abbreviated name formalization conversion which substitutes a string "MW" to a string "ミトルウエア" is performed for a string of "name" corresponding to data of "id"=002.

At next step 312, the substitution source string search unit 28 determines whether there is another target string. When the determination result at step 312 is "YES", the process returns to step 280, the processings from step 280 to step 312 are repeated until the determination result at step 312 is "NO". When the determination result at step 312 is "YES", the string search/substitution processing is completed.

When the string search/substitution processing is completed, the process proceeds to step 162 of the name identification processing illustrated in FIG. 3. At step 162, the matching processing unit 20 performs a matching processing in which data that went through the string search/substitution processing are compared by a record unit, an estimated value which represents whether the compared data is data of the same person is computed, and a record of which estimated value is a threshold value or more is determined as the data of the same person. An example of the result of the matching processing is illustrated in FIG. 4D. FIG. 4D illustrates the estimated values for data of "id"=001 and "id"=002 are 100, respectively, and the estimated values for data of "id"=003 and "id"=006 are 90, respectively.

Also, at next step 164, the matching result unification unit 22 performs the name identification processing in which records determined as data of the same person is unified into a single record based on a result of the matching processing by the matching processing unit 20. Accordingly, a duplicate data of the same person registered in master DB 96 is unified to reduce the redundancy of data.

As described above, in the present embodiment, since plural types of substitution tables applied to the string substitution is unified into a single unification substitution table in advance, searching of the substitution source string for the target string is completed by being performed once. Further, a prefix tree for which failure link is constructed from the substitution source string registered in the unification substitution table and the string search/substitution processing is performed using the prefix tree having the failure link and thus, the search process is completed by being performed once per each character of the target string. Accordingly, it is possible to reduce a processing time which is taken for substituting the substitution source string included in the target string for conversion with the substitution destination string.

Further, in the above-described description, an aspect in which the application server 38 performs the name identification processing according to an instruction from the terminal device 40 is described, the technique disclosed is not limited to the aspect, but may also be implemented with a single computer.

Further, in the above-described description, an aspect in which the string substitution is applied to the name identification processing for the master DB 96 is described, the technique disclosed is not limited to the aspect, but may also be used solely, and otherwise, used being combined with a processing other than the name identification processing.

Further, in the above-described description, an aspect in which the string substitution is applied to the Japanese string, the technique disclosed is not limited to the aspect, but may also be applied to a string substitution for the string described with a language other than the Japanese.

Further, in the above-described description, an aspect in which the name identification processing program 56 which is one example of the string substitution program according to the disclosed technique is previously stored (installed) in the storage unit 50 of the application server 38 in advance is described. However, the technique disclosed is not limited the aspect, but the string substitution program according to the disclosed technique may also be provided in a type of program recorded in a recording medium such as a CD-ROM or a DVD-ROM.

The entire contents of all of the documents, the patent application and technical standards described in the present specification is specifically incorporated herein by reference and in the same level as described those documents patent application and technical standards.

Next, with respect to the technique described above, an analysis and examination conducted by the present inventors will be described in order to ascertain that unification of plural types of substitution tables is unified into a single unification substitution table making it possible to reduce the processing time.

First, we consider a processing time required for constructing a prefix tree. The prefix tree can be constructed with performing a processing once per one character of the substitution source string. Further, the types of characters assigned to a branch have a finite fixed value (even though the character is an alphabet character or a kanji character, the characters have the same finite fixed value). Therefore, when it is assumed that the number of the substitution patterns within a substitution table is one (1) and the lengths of a substitution source string in the respective substitution patterns are p1, p2, . . . , pk, a time Ttrie required for constructing the prefix tree is expressed as the following equation (1).

$$T\text{trie}=O(p1)+O(p2)+\ldots+O(pl)=O(p1+p2+\ldots+pl)=O(p) \quad (1)$$

where p is a total of lengths of the substitution source strings in the substitution table.

Further, each node can be computed at a predetermined time in a failure link addition, and a time Tfailurelink required for adding the failure link constructing a prefix tree is sufficiently smaller than the time required for constructing the prefix tree Ttrie, and thus the following equation (2) is established.

$$T\text{trie}+T\text{failurelink}\approx T\text{trie}=O(p) \quad (2)$$

Further, the string search (matching) in the string search/substitution processing is completed by performing a processing once per one character of the target string, and outputs matching information each time when reaching a node to which an ID is assigned. Further, the substitution of string is performed for the number of times that equals to the number of substitution source strings determined finally as a target for substitution. Therefore, when it is assumed that the length of the target string is n, the number of the substitution source strings included in the target string is k, and the number of the substitution source strings determined finally as the target for substitution is q, a processing time Tmatching required for searching the string, and a processing time Treplace required for substitution of the string is expressed as the following equation (3).

$$T\text{matching}+T\text{replace}=O(n+k)+O(q)=O(n+k+q) \quad (3)$$

Accordingly, the entire processing time is expressed as the following equation (4).

$$T\text{trie}+T\text{failurelink}+T\text{matching}+T\text{replace}= \\ O(p)+O(n+k)+O(q)=O(p+n+k+q) \quad (4)$$

In a case where a string substitution is performed without performing unification of m types of substitution tables, it is assumed that the total length of the substitution source strings in the respective substitution tables is Pi, the total length of the target strings for conversion in the respective substitution tables is Ni, and the number of substitution source strings included in the target string is Ki. Further, it is assumed that the number of substitution source strings determined finally as a target for substitution is Qi. Where, i is 1<i<m. In this case, the processing time Tnot-unified for a case where a string substitution is performed without performing unification of m types of substitution tables is expressed as the following equation (5).

$$T\text{not-unified}=O(P1+N1+K1+Q1)+\ldots+O(Pm+Nm+Km+Qm) \quad (5)$$

Here, it is assumed that the total length of the substitution source strings in all the substitution tables is P. That is, P=P1+P2+ . . . +Pm. Further, it is assumed that the number of the substitution source strings matched in all searching processing is K. That is, K=K1+K2+ . . . +Km. Further, it is assumed that the number of the substitution source strings substituted in all searching processing is Q. That is, Q=Q1+Q2+ . . . +Qm. The total length of the target string for conversion is regarded as the same (=N) in each processing. When it is assumed that N1+N2+ . . . +Nm=N, the previous equation (5) is rewritten as the following equation (6).

$$T\text{not-unified}=O(P+mN+K+Q) \quad (6)$$

In the meantime, in a case where a string substitution is performed by performing unification of m types of substitution tables, it is assumed that the total length of the substitution source strings in the unified substitution table is P', the total length of the target strings for conversion in the unified substitution tables is N', and the number of substitution source strings included in the target string is K'. Further, it is assumed that the number of substitution source strings determined finally as a target for substitution is Q'. In this case, the processing time Tunified for a case where a string substitution is performed by performing unification of m types of substitution tables is expressed as the following equation (7).

$$T_{unified}=O(P'+N'+K'+Q') \quad (7)$$

Here, as premise in comparison of the time Tnot-unified expressed as the equation (6) with the time Tunified expressed as the equation (7), the total length of the target strings for conversion before unification is regarded as the same as that after unification (N=N').

Further, even though the total length of the substitution source string is increased due to the unification of the substitution tables, if the total length of the target strings for conversion is sufficiently larger than that of the substitution source string, it may be considered that the effect for the processing time is very little (P<<N). It may be considered that by nature, the name identification intends to find a duplicate data in an enormous data and the total length of the target string in the master DB 96 is sufficiently larger than that of the substitution source string.

Further, it may be considered that no sequential substitution is generated with respect to the target string for conversion and the total length of the target string for conversion is sufficiently larger than the number K of the substitution source string included in the target string or the number Q of substitution source strings determined finally as a target for substitution (K<<N, Q<<N).

When the ratio of a processing time for a case where a string substitution is performed by performing unification of m types of substitution tables to another processing time for a case where a string substitution is performed without performing unification of m types of substitution tables is computed based on the above-mentioned premises, the following equation (8) is obtained.

Equation 1

$$\frac{T_{unified}}{T_{not\text{-}unified}} = \frac{O(P'+N'+K'+Q')}{O(P+mN+K+Q)} \approx \frac{O(N')+O(P'+K'+Q')}{O(P+mN+K+Q)} \approx \quad (8)$$

$$\frac{O(N')}{O(mN)} + \frac{O(P'+K'+Q')}{O(mN)} \approx \frac{1}{m} \cdot \left(1 + \frac{O(P'+K'+Q')}{O(N)}\right)$$

In the above equation (8), we obtained knowledge that the processing time ratio described above is decreased (the processing time reduced) to a value which is slightly larger than 1/(the number m of substitution tables).

The present inventors conducted an experiment in which the processing times for the case where the string substitution (name identification) is performed by performing unification and for the case where the string substitution (name identification) is performed without performing unification are measured and compared, respectively, in order to ascertain the knowledge described above. In the experiment, the number of records included in a target master DB for name identification was a list of about 430,000 corporation names and a sixteen substitution tables were used. The result of the measured processing time is indicated in the following table 2.

TABLE 2

|  | processing time for substitution tables unification | processing time for string substitution | total processing time |
|---|---|---|---|
| a case where substitution tables are not unified | — | 05:08.25 | 05:08.25 |

TABLE 2-continued

|  | processing time for substitution tables unification | processing time for string substitution | total processing time |
|---|---|---|---|
| a case where substitution tables are unified | 00:01.80 | 00:25.73 | 00:27.53 |

As apparent from the table 2, it is ascertained that the processing time is drastically reduced by performing unification of the substitution tables. A processing time ratio in the measurement result indicated in Table 2 is about 1/11.98 and does not reach 1/m=1/16, but it is thought that the cause is the I/O performance of the storage.

According to the present disclosure, it is possible to reduce the processing time when a substitution source string is substituted with a substitution destination string included in a target string for conversion.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A string substitution apparatus comprising:
   a memory; and
   a processor coupled to the memory and configured to:
   unify plural types of substitution tables into a single substitution table, a substitution source string and a substitution destination string being mapped to each other and registered in each of the plural types of substitution tables,
   construct a prefix tree to incorporate the substitution source string registered in the single substitution table unified, the prefix tree having plural nodes and plural branches each of which connects a pair of nodes of the plural nodes and is assigned a label of one character and in which characters of the label assigned to the branches each of which having one end connected to the same node are different from each other, and a string represented by characters of the label assigned to plural branches on route from a root node to a certain node is identical to the substitution source string mapped to the substitution source string,
   perform an addition of a link failure directing from a first node to a second node for all nodes included in the prefix tree using each of all nodes as the first node in a case where a suffix having the longest length of a string represented by characters of the label assigned to plural branches on route from the root node to the first node included in the prefix tree constructed is identical to a string represented by characters of the label assigned to plural branches on route from the root node to a second node which is different from the first node, and
   repeat migrating to a node connected to the other end of branch to which a character extracted is assigned as a label among the branches each of which having one end connected to the current node using the root node as an initial node in a case where the branch is present, migrating to a node connected to a front end of the link failure in a case where the branch to which the character extracted is assigned as a label among the branches each of which having one end connected to the current node is not present and a basis end of the link failure is connected to the current node, and recording of identification information in a case where the identification information is assigned to a node before migration, while extracting characters from a target string for substitution one character by one character, until all characters are extracted from a top most of the target string, thereby searching the substitution source string included in the target string.

2. The string substitution apparatus according to claim 1, wherein the processor is configured to register a pair of the substitution source string and the substitution destination string registered in a substitution table having an earlier application sequence among the plural types of substitution tables into the single substitution table in a case where the same substitution source string and a different substitution destination string are mapped to each other and registered into the plural types of tables.

3. The string substitution apparatus according to claim 1, wherein the processor is configured to register a pair of the first string as the substitution source string and the third string as the substitution destination string into the single substitution table in a case where a first string as the substitution source string and a second string as the substitution destination string are mapped to each other and registered into a first substitution table, the second string as the substitution source string and a third string as the substitution destination string are mapped to each other and registered into a second substitution table, and the first substitution table has an earlier application sequence than the second substitution table.

4. The string substitution apparatus according to claim 1, wherein the processor is configured to register a pair of the first string as the substitution source string and a string in which the third string included in the second string as the substitution destination string is replaced with a fourth string, and a pair of a third string as the substitution source string and the fourth string the substitution destination string into the single substitution table in a case where the first string as the substitution source string and the second string as the substitution destination string are mapped to each other and registered into the first substitution table, the third string included in the second string as the substitution source string and the fourth string as the substitution destination string are mapped to each other and registered into a second substitution table, and the first substitution table has an earlier application sequence than the second substitution table.

5. The string substitution apparatus according to claim 1, wherein the processor is configured to register a pair of the first string as the substitution source string and the second string as the substitution destination string, a pair of the third string as the substitution source string and the fourth string as the substitution destination string, and a pair of a string included in the third string but not included in the second string is added to the first string as the substitution source string and the fourth string as the substitution source string into the single substitution table, in a case where the first string as the substitution source string and the second string as the substitution destination string are mapped to each other and registered into the first substitution table, the third string including the second string as the substitution source string and the fourth string as the substitution destination string are mapped to each other and registered into the second substitution table, and the first substitution table has an earlier application sequence than the second substitution table.

6. The string substitution apparatus according to claim 1, wherein the processor is configured to substitute the substitution source string included in the target string found with a substitution destination string mapped to the substitution source string.

7. The string substitution apparatus according to claim 1, wherein the processor is configured to select the substitution source string having a relatively long length and not having redundancy in the target string among the substitution source strings which correspond to recorded information as the substitution source string to be included in the target string.

8. The string substitution apparatus according to claim 1, wherein the processor is configured to construct a prefix tree to incorporate the substitution source string registered in the substitution table unified, for each of all substitution source strings registered in the substitution table unified, by migrating to a node connected to the other end of branch to which a character extracted is assigned as a label among the branches each of which having one end connected to the current node using the root node as an initial node in a case where the branch is present, by newly making a branch to which a character after the extracted character assigned as a label and a node, by migrating to a node connected to a front end of the link failure in a case where the branch to which a character extracted is assigned as a label among the branches each of which having one end connected to the current node is not present, and by assigning identification information which corresponds to the substitution source string to the last node in a case where a rear most of the substitution source string is reached, while extracting characters from a top most of the substitution source string mapped to the substitution destination string one character by one character.

9. A string substitution method comprising:
unifying plural types of substitution tables in each of which a substitution source string and a substitution destination string are mapped to each other and registered into a single substitution table;
constructing a prefix tree to incorporate the substitution source string registered in the substitution table unified by the unifying, the prefix tree having plural nodes and plural branches each of which connects a pair of nodes of the plural nodes and is assigned a label of one character and in which characters of the label assigned to the branches each of which having one end connected to the same node are different from each other and a string represented by characters of the label assigned to plural branches on route from a root node to a certain node is identical to the substitution source string mapped to the substitution source string;
performing addition of a link failure directing from a first node to a second node for all nodes included in the prefix tree using each of all nodes as the first node in a case where a suffix having the longest length of a string represented by characters of the label assigned to plural branches on route from the root node to the first node is identical to a string represented by characters of the label assigned to plural branches on route from the root node to a second node which is different from the first node; and searching the substitution source string included in the target string by repeating migration to a node connected to the other end of branch to which a character extracted is assigned as a label among the branches each of which having one end connected to the current node using the root node as an initial node in a case where the branch is present, migration to a node connected to a front end of the link failure in a case where the branch to which the character extracted is assigned as a label among the branches each of which having one end connected to the current node is not present and a basis end of the link failure is connected to the current node, and recordation of identification information in a case where the identification information is assigned to a node before migration, while extracting characters from a target string one character by one character, until all characters are extracted from a top most of the target string.

10. The string substitution method according to claim 9, further comprising:

register a pair of the substitution source string and the substitution destination string registered in a substitution table having an earlier application sequence among the plural types of substitution tables into the single substitution table in a case where the same substitution source string and a different substitution destination string are mapped to each other and registered into the plural types of tables.

11. The string substitution method according to claim 9, further comprising:

register a pair of the first string as the substitution source string and the third string as the substitution destination string into the single substitution table in a case where a first string as the substitution source string and a second string as the substitution destination string are mapped to each other and registered into a first substitution table, the second string as the substitution source string and a third string as the substitution destination string are mapped to each other and registered into a second substitution table, and the first substitution table has an earlier application sequence than the second substitution table.

12. The string substitution method according to claim 9, further comprising:

register a pair of the first string as the substitution source string and a string in which the third string included in the second string as the substitution destination string is replaced with a fourth string, and a pair of a third string as the substitution source string and the fourth string the substitution destination string into the single substitution table in a case where the first string as the substitution source string and the second string as the substitution destination string are mapped to each other and registered into the first substitution table, the third string included in the second string as the substitution source string and the fourth string as the substitution destination string are mapped to each other and registered into a second substitution table, and the first substitution table has an earlier application sequence than the second substitution table.

13. The string substitution method according to claim 9, register a pair of the first string as the substitution source string and the second string as the substitution destination string, a pair of the third string as the substitution source string and the fourth string as the substitution destination string, and a pair of a string included in the third string but not included in the second string is added to the first string as the substitution source string and the fourth string as the substitution source string into the single substitution table, in a case where the first string as the substitution source string and the second string as the substitution destination string are mapped to each other and registered into the first substitution table, the third string including the second string as the substitution source string and the fourth string as the substitution destination string are mapped to each other and registered into the second substitution table, and the first substitution table has an earlier application sequence than the second substitution table.

14. The string substitution method according to claim 9, further comprising:

substituting the substitution source string included in the target string found by the searching with a substitution destination string mapped to the substitution source string.

15. The string substitution method according to claim 9, further comprising:

selecting the substitution source string having a relatively long length and not having redundancy in the target string among the substitution source strings which correspond to recorded information as the substitution source string to be included in the target string.

16. The string substitution method according to claim 9, further comprising:

constructing a prefix tree to incorporate the substitution source string registered in the substitution table unified by the unifying, for each of all substitution source strings registered in the substitution table unified by the unifying, by migrating to a node connected to the other end of branch to which a character extracted is assigned as a label among the branches each of which having one end connected to the current node using the root node as an initial node in a case where the branch is present, by newly making a branch to which a character after the extracted character assigned as a label and a node, by migrating to a node connected to a front end of the link failure in a case where the branch to which a character extracted is assigned as a label among the branches each of which having one end connected to the current node is not present, and by assigning identification information which corresponds to the substitution source string to the last node in a case where a rear most of the substitution source string is reached, while extracting characters from a top most of the substitution source string mapped to the substitution destination string one character by one character.

17. A non-transitory computer-readable storage medium storing a program for causing a computer to execute a process, the process comprising:

unifying plural types of substitution tables in each of which a substitution source string and a substitution destination string are mapped to each other and registered into a single substitution table;

constructing a prefix tree to incorporate the substitution source string registered in the substitution table unified by the unifying, the prefix tree having plural nodes and plural branches each of which connects a pair of nodes of the plural nodes and is assigned a label of one character and in which characters of the label assigned to the branches each of which having one end connected to the same node are different from each other and a string represented by characters of the label assigned to plural branches on route from a root node to a certain node is identical to the substitution source string mapped to the substitution source string;

performing addition of a link failure directing from a first node to a second node for all nodes included in the prefix tree using each of all nodes as the first node in a case where a suffix having the longest length of a string represented by characters of the label assigned to plural branches on route from the root node to the first node is identical to a string represented by characters of the label assigned to plural branches on route from the root node to a second node which is different from the first node; and searching the substitution source string included in the target string by repeating migration to a node connected to the other end of branch to which a character extracted is assigned as a label among the branches each of which having one end connected to the current node using the root node as an initial node in a case where the branch is present, migration to a node connected to a front end of the link failure in a case where the branch to which the character extracted is assigned as a label among the branches each of which having one end connected to the current node is not present and a basis end of the link failure is connected to the current node, and recordation of identification information in a case where the identification information is assigned to a node before migration, while extracting characters from a target string one character by one character, until all characters are extracted from a top most of the target string.

18. The storage medium according to claim 17, wherein the process further comprising:

register a pair of the substitution source string and the substitution destination string registered in a substitution table having an earlier application sequence among the plural types of substitution tables into the single substitution table in a case where the same substitution source string and a different substitution destination string are mapped to each other and registered into the plural types of tables.

19. The storage medium according to claim 17, wherein the process further comprising:

register a pair of the first string as the substitution source string and the third string as the substitution destination string into the single substitution table in a case where a first string as the substitution source string and a second string as the substitution destination string are mapped to each other and registered into a first substitution table, the second string as the substitution source string and a third string as the substitution destination string are mapped to each other and registered into a second substitution table, and the first substitution table has an earlier application sequence than the second substitution table.

20. The storage medium according to claim 17, wherein the process further comprising:

register a pair of the first string as the substitution source string and a string in which the third string included in the second string as the substitution destination string is replaced with a fourth string, and a pair of a third string as the substitution source string and the fourth string the substitution destination string into the single substitution table in a case where the first string as the substitution source string and the second string as the substitution destination string are mapped to each other and registered into the first substitution table, the third string included in the second string as the substitution source string and the fourth string as the substitution destination string are mapped to each other and registered into a second substitution table, and the first substitution table has an earlier application sequence than the second substitution table.

* * * * *